(12) United States Patent
Burroughs et al.

(10) Patent No.: US 8,929,919 B2
(45) Date of Patent: *Jan. 6, 2015

(54) METHOD AND APPARATUS FOR PERFORMING POSITION DETERMINATION WITH A SHORT CIRCUIT CALL FLOW

(75) Inventors: Kirk Allan Burroughs, Alamo, CA (US); Stephen William Edge, Escondido, CA (US); Sven Fischer, Nuernberg (DE)

(73) Assignee: QUALCOMM Incorporated, San Diego, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 13/175,331

(22) Filed: Jul. 1, 2011

(65) Prior Publication Data

US 2011/0319095 A1    Dec. 29, 2011

Related U.S. Application Data

(63) Continuation of application No. 11/377,856, filed on Mar. 15, 2006, now Pat. No. 7,974,639, which is a continuation-in-part of application No. 10/561,801, filed as application No. PCT/US2005/003563 on Feb. 4, 2005, now Pat. No. 7,421,277.

(60) Provisional application No. 60/693,003, filed on Jun. 21, 2005.

(51) Int. Cl.
*H04W 24/00* (2009.01)
*G01S 5/02* (2010.01)
*H04W 64/00* (2009.01)
*H04W 84/06* (2009.01)

(52) U.S. Cl.
CPC .............. *G01S 5/0205* (2013.01); *H04W 64/00* (2013.01); *H04W 84/06* (2013.01)
USPC .................................... 455/456.2; 455/456.1

(58) Field of Classification Search
USPC .................................... 455/456.2, 456.1, 567
See application file for complete search history.

(56) References Cited

U.S. PATENT DOCUMENTS 6,313,787 B1    11/2001 King et al.
6,353,743 B1    3/2002 Karmel
(Continued)

FOREIGN PATENT DOCUMENTS

EP    1617686 A1    1/2006
EP    1638350 A1    3/2006
(Continued)

OTHER PUBLICATIONS

Duan, "A Disposal Method of Location Information Request in The Location Service", Wipo, Jan. 13, 2005, p. 1.

(Continued)

*Primary Examiner* — Creighton Smith

(57) ABSTRACT

For a call flow to perform position determination, a network sends to a user equipment (UE) an indication (e.g., a request for permission) to perform a position fix for the UE. The UE responds by sending to the network an acknowledgment (e.g., a grant of permission) to perform the position fix. The UE selectively sends a position estimate for itself to the network, typically along with the acknowledgment. The network may initiate location processing if (1) a location estimate is not received from the UE or (2) a location estimate is received from the UE but the network decides not to use this location estimate. In this case, the network and the UE perform location processing to obtain a position fix for the UE. However, if a location estimate is received from the UE and the network decides to use the location estimate, then the location processing is bypassed or short circuited.

64 Claims, 12 Drawing Sheets

(56) References Cited

U.S. PATENT DOCUMENTS

| | | |
|---|---|---|
| 6,369,751 B1 | 4/2002 | Naruse |
| 6,453,237 B1 | 9/2002 | Fuchs et al. |
| 6,718,177 B1 | 4/2004 | Comer et al. |
| 6,898,433 B1 | 5/2005 | Rajaniemi et al. |
| 6,975,941 B1 | 12/2005 | Lau et al. |
| 7,016,693 B2 | 3/2006 | Guyot |
| 7,054,620 B2 | 5/2006 | Ewert et al. |
| 7,218,940 B2 | 5/2007 | Niemenmaa et al. |
| 7,277,711 B2 | 10/2007 | Nyu |
| 7,421,277 B2 | 9/2008 | Burroughs |
| 7,424,293 B2 | 9/2008 | Zhu |
| 7,536,695 B2 | 5/2009 | Alam et al. |
| 7,627,332 B2 | 12/2009 | Shim |
| 7,706,813 B2 | 4/2010 | Shim |
| 7,869,817 B2 | 1/2011 | Shim |
| 7,925,276 B2 | 4/2011 | Shim |
| 7,974,639 B2 | 7/2011 | Burroughs et al. |
| 8,068,056 B2 | 11/2011 | Wachter et al. |
| 2003/0225515 A1 | 12/2003 | Havlark et al. |
| 2004/0106414 A1 | 6/2004 | Ewert et al. |
| 2004/0137918 A1 | 7/2004 | Varonen et al. |
| 2004/0192337 A1 | 9/2004 | Hines et al. |
| 2004/0193707 A1 | 9/2004 | Alam et al. |
| 2004/0203914 A1 | 10/2004 | Kall et al. |
| 2004/0253964 A1 | 12/2004 | Zhu |
| 2005/0020276 A1 | 1/2005 | Maanoja et al. |
| 2005/0043038 A1 | 2/2005 | Maanoja et al. |
| 2005/0075099 A1 | 4/2005 | Guyot |
| 2005/0118999 A1 | 6/2005 | Zhu |
| 2005/0125493 A1 | 6/2005 | Chaskar et al. |
| 2005/0136942 A1 | 6/2005 | Timiri et al. |
| 2005/0148340 A1 | 7/2005 | Guyot |
| 2005/0153706 A1 | 7/2005 | Niemenmaa et al. |
| 2005/0239480 A1 | 10/2005 | Kim et al. |
| 2006/0036680 A1 | 2/2006 | Shim |
| 2006/0099958 A1 | 5/2006 | Gustafsson et al. |
| 2006/0099960 A1 | 5/2006 | Duan |
| 2006/0099961 A1 | 5/2006 | Duan |
| 2006/0135174 A1 | 6/2006 | Kraufvelin et al. |
| 2006/0258371 A1 | 11/2006 | Krishnamurthi et al. |
| 2006/0293066 A1 | 12/2006 | Edge et al. |
| 2007/0004429 A1 | 1/2007 | Edge et al. |
| 2007/0026871 A1 | 2/2007 | Wager |
| 2007/0054675 A1 | 3/2007 | Duan |
| 2007/0054676 A1 | 3/2007 | Duan et al. |
| 2007/0173253 A1 | 7/2007 | Duan et al. |
| 2008/0139218 A1 | 6/2008 | Duan |
| 2010/0173607 A1* | 7/2010 | Thornton et al. ............. 455/410 |
| 2012/0264448 A1 | 10/2012 | Wachter et al. |
| 2013/0210451 A1 | 8/2013 | Edge et al. |

FOREIGN PATENT DOCUMENTS

| | | |
|---|---|---|
| EP | 1686814 A1 | 8/2006 |
| JP | 2001346264 A | 12/2001 |
| JP | 2003235070 A | 8/2003 |
| JP | 2004061187 | 2/2004 |
| JP | 2004279409 A | 10/2004 |
| JP | 2006526338 | 11/2006 |
| JP | 2007511967 | 5/2007 |
| JP | 2007534180 | 11/2007 |
| KR | 20030015577 | 2/2003 |
| RU | 2002121494 | 3/2004 |
| WO | WO9711384 | 3/1997 |
| WO | WO0345101 A1 | 5/2003 |
| WO | WO0361322 A1 | 7/2003 |
| WO | WO2004112410 A1 | 12/2004 |
| WO | WO2004114688 A1 | 12/2004 |
| WO | WO2004114689 | 12/2004 |
| WO | WO2005051009 A1 | 6/2005 |
| WO | WO2005069670 | 7/2005 |

OTHER PUBLICATIONS

Secure User Plane Location Architecture, Candidate Version 1.0-Jul. 19, 2005, Open Mobile Alliance OMA-AD-SUPL-V1_0-20050719-C. Jul. 2005, pp. 1-80.

Secure User Plane Location Architecture, OMA, Draft Version 1 .0, Nov. 1, 2004, pp. 57.

Wang J., et al., "OMA-LOC-2004-136R03-CR_SUPL_AD_Message_Periodic Call Flows", Jun. 2004, URL, http://member.openmobilealliance.org/ftp/Public_documents/LOC/2004/OMA-LOC-2004-0136R03-SUPL_Periodic_Call_Flows.zip.

3GPP, "3rd Generation Partnership Project; Technical Specification Group GSM/EDGE Radio Access Network; Functional Stage 2 description of Location Services (LCS) in GERAN (Release 7)," 3GPP TS 43.059 v7.0.0, pp. 1-67 (Apr. 2005).

3GPP, "3rd Generation Partnership Project; Technical Specification Group Radio Access Network; Stage 2 functional specification of User Equipment (UE) positioning in UTRAN (Release 6)," 3GPP TS 25.305 v6.1.0, pp. 1-54 (Jun. 2006).

3GPP TS 23.032 V6.0.0 (Dec. 2004), 3rd Generation Partnership Project; Technical Specification Group Core Network; Universal Geographical Area Description (GAD) (Release 6).

3GPP TS 23.171 v3.11.0; "3rd Generation Partnership Project; Technical Specification Group Services and System Aspects; Functional stage 2 description of location services in UMTS," 3GPP TS 23.171 version 3.11.0 Release 1999 (Mar. 2004).

3GPP TS 23.271 v6.10.0; "3rd Generation Partnership Project; Technical Specification Group Services and System Aspects; Functional stage 2 description of Location Services (LCS)," 3GPP TS 23.271 version 6.10.0 Release 6 (Dec. 2004).

3GPP TS 23.271 v7.1.0; "3rd Generation Partnership Project; Technical Specification Group Services and System Aspects; Functional stage 2 description of Location Services (LCS)," 3GPP TS 23.271 version 7.1.0 Release 7 (Jun. 2005).

3GPP TS 24.080 v6.3.0; "3rd Generation Partnership Project; Technical Specification Group Core Network; Mobile radio interface layer 3 supplementary services specification; Formats and coding," 3GPP TS 24.080 version 6.3.0 Release 6 (Mar. 2005).

3GPP TS 25.453 v6.9.0; "3rd Generation Partnership Project; Technical Specification Group Radio Access Network; UTRAN Iupc interface Positioning Calculation Application Part (PCAP) signalling," 3GPP TS 25.453 version 6.9.0 Release 6 (Jun. 2005).

3GPP TS 43.059 V6.1.0 (Jun. 2003); 3rd Generation Partnership Project; Technical Specification Group GSM/EDGE Radio Access Network; Functional stage 2 description of Location Services (LCS) in GERAN (Release 6).

3GPP2 X.S0024 v1.0; "IP-Based Location Services," 3GPP2 X.S0024 version 1.0 Revision 0 (Oct. 2005).

3rd Generation Partnership Project 2 "3GPP2": "TIA/EIA-41-D Location Services Enhancements," 3GPP2 X.S0002, Version 1.0.0, pp. 1-234 (Mar. 2004).

Anonymous: "Position Determination Service for cdma2000(R) Spread Spectrum Systems;(Revision of TIA/EIA/IS-801);TIA-801-A" 19000101, (Apr. 2004), XP017004816 p. 2.5-p. 2.6.

Defendant QUALCOMM Incorporated, Snaptrack, Inc. and Norman Krasner's Answer to Fourth Amended Complaint, Case 3:08-cv-01992-MMA-POR, Document 54, pp. 1-26. Jan. 21, 2010.

ETSI TS 125.305 v 6.1.0: "Universal Mobile Telecommunications Systems (UMTS)," European Telecommunications Standard Institute, France, (Jun. 1, 2004), XP014016761.

International Preliminary Report on Patentability—PCT/US05/003563, International Preliminary Examining Authority—Alexandria, Virginia, USA—Oct. 25, 2005.

International Preliminary Report on Patentability—PCT/US2006/024328, International Bureau of WIPO—Geneva, Switzerland—Dec. 24, 2007.

International Preliminary Report on Patentability—PCT/US2006/024374, International Bureau of WIPO—Geneva, Switzerland—Dec. 24, 2007.

(56) References Cited

OTHER PUBLICATIONS

International Preliminary Report on Patentability—PCT/US2006/033250, International Bureau of WIPO—Geneva, Switzerland—Feb. 26, 2008.

International Search Report-PCT/US05/003563, International Search Authority—Alexandria, Virginia, US, Jun. 9, 2005.

International Search Report—PCT/US2006/024328, International Search Authority—European Patent Office—Nov. 13, 2006.

International Search Report—PCT/US2006/024374, International Search Authority—European Patent Office—Nov. 22, 2006.

International Search Report—PCT/US2006/033250, International Searching Authority—European Patent Office—Dec. 19, 2006.

OMA, "Secure User Plane Location Architecture," Nov. 21, 2005, Open Mobile Alliance (OMA), Candidate Version 1.0, 80 pages.

OMA-AD-SUPL-V1_0-20050719-C; "Secure User Place Location Architecture, " Open Mobile Alliance, Candidate Version 1.0, XP002410620, Jul. 19, 2005.

OMA-AD-SUPL-V2_0-20060619-D; "Secure User Plane Location Architecture," Open Mobile Alliance, Draft Version 4.0, Jun. 19, 2006.

OMA-TS-ULP-V1_0-20060704-C: "User Plane Location Protocol," Open Mobile Alliance, Candidate Version 1.0, Jan. 22, 2007.

OMA-TS-ULP-V2_0-20060727-D; "User Plane Location Protocol, " Open Mobile Alliance, Draft Version 2.0, Jul. 27, 2006.

"Plaintiffs' First Amended Complaint," United States District Court Case:3:08-cv-01992-MMA-POR, Document 14, pp. 1-39. Apr. 29, 2009.

"Plaintiffs' Fourth Amended Complaint", United States District Court Case 3:08-cv-01992-MMA-POR, Document 53, pp. 1-33, Jan. 11, 2010.

"Plaintiffs' Original Complaint," United States District Court Case:3:08-cv-01992-BEN-NLS, pp. 1-34, Oct. 24, 2008.

"Plaintiffs' Second Amended Complaint," United States District Court Case:3:08-cv-01992-MMA-POR, Document 36, pp. 1-40, Sep. 14, 2009.

"Plaintiffs' Third Amended Complaint," United States District Court Case:3:08-cv-01992-MMA-POR, Document 40, pp. 1-35, Oct. 9, 2009.

QUALCOMM Incorporated: "S2-051535: Efficient Support of Periodic Location," 3GPP TSG SA WG2 S2#47, [Online] Jun. 27, 2005-Jul. 1, 2005, pp. 1-14, XP002405914, Montreal, Canada.

QUALCOMM, "S2-051536: CR: 23.271: Addition of Periodic Location Procedures," 3GPP TSG-SA WG2 Meeting #47, Jul. 1, 2005, pp. 1-26, XP-002410621, Montreal, Canada.

Translation of Office Action in Japan Application 2008-528197 corresponding to U.S. Appl. No. 11/510,332 (Dec. 14, 2010), citing "Secure User Place Location Architecture" XP002410620; Jul. 19, 2005 Candidate Version 1.0 —19, P1-80, OMA-AD-SUPL-V1_0-20050719-C; and JP Pat. Application 200461187.

Written Opinion—PCT/US05/003563, International Search Authority—Alexandria, Virginia, US, Jun. 9, 2005.

Written Opinion—PCT/US2006/024328, International Search Authority—European Patent Office—Nov. 13, 2006.

Written Opinion—PCT/US2006/024374, International Search Authority—European Patent Office—Nov. 22, 2006.

Written Opinion—PCT/US2006/033250, International Searching Authority—European Patent Office—Dec. 19, 2006.

3GPP TSG-RAN WG3: "Addition of the U-TDOA location method to the UTRAN", Cingular Wireless, T-Mobile USA, Andrew Corporation, TruePosition, 3GPP TSG-RAN WG3 Meeting #47, R3-050764, May 13, 2005, pp. 1-37.

* cited by examiner

METHOD AND APPARATUS FOR PERFORMING POSITION DETERMINATION WITH A SHORT CIRCUIT CALL FLOW

This application is a continuation of U.S. patent application Ser. No. 11/377,856, entitled METHOD AND APPARATUS FOR PERFORMING POSITION DETERMINATION WITH A SHORT CIRCUIT CALL FLOW, filed Mar. 15, 2006, which claims priority to provisional U.S. patent application Ser. No. 60/693,003, entitled METHOD AND APPARATUS FOR PROVIDING LOCATION SERVICES WITH SHORT-CIRCUITED MESSAGE FLOWS, filed Jun. 21, 2005, and which is a continuation-in-part of U.S. application Ser. No. 10/561,801, issued on Sep. 2, 2008 as U.S. Pat. No. 7,421,277, entitled METHOD AND APPARATUS FOR PERFORMING POSITION DETERMINATION WITH A SHORT CIRCUIT CALL FLOW, filed Dec. 15, 2005, which is a national stage application of PCT Patent Application No. PCT/US2005/003563, filed Feb. 4, 2005, all assigned to the assignee hereof and incorporated herein by reference.

BACKGROUND

1. Field

The present invention relates generally to communication, and more specifically to a method and apparatus for performing position determination.

2. Background

It is often desirable, and sometimes necessary, to know the position of a wireless device in a network. For example, a wireless user may utilize the wireless device to browse through a website and may click on location sensitive content. The web server may then query the network for the position of the wireless device. The network would initiate location processing with the wireless device in order to perform a position fix and ascertain the position of the wireless device. The network would then return a position estimate for the wireless device to the web server, which uses this position estimate to provide appropriate content to the wireless user. There are many other scenarios in which knowledge of the location of the wireless device is useful or necessary. In the following description, the terms "location" and "position" are synonymous (e.g., the terms "location estimate" and "position estimate" are synonymous) and are used interchangeably.

The network typically implements a specific call flow (which may also be called a message flow or a procedure) for network-initiated position determination. For the call flow, the network may send a message to ask the wireless user for permission to perform the position fix. The wireless user may respond by either granting or denying the request. If the request is granted, then the network and the wireless device perform location processing to obtain a position fix for the wireless device. This location processing may entail (1) invoking a network entity (e.g., a positioning server) designated to handle position determination for the wireless device and/or (2) exchanging messages between this network entity and the wireless device to perform a position fix for the wireless device.

The call flow for the network-initiated position determination is typically performed in its entirety each time the position of the wireless device is queried. For example, if the wireless user clicks on different location sensitive contents, then the position of the wireless device may be queried and the location processing may be performed each time that the location sensitive content is clicked. This may result in inefficient use of system resources.

There is therefore a need in the art for a method and apparatus for efficiently performing position determination.

SUMMARY

A method and apparatus for efficiently performing position determination for a wireless device, which is also called a user equipment (UE), is described herein. In one embodiment of the method and apparatus, a network sends to the UE an indication (e.g., a request for permission) to perform a position fix for the UE. The network may send this indication in response to receiving a request from a client entity asking for the location of the UE. The UE responds by sending to the network an acknowledgment (e.g., a grant of permission) to perform the position fix. The UE selectively (or optionally) sends to the network a location estimate for itself, typically along with the acknowledgment, if this location estimate is available and even if the network did not request for the location estimate. The network may initiate location processing if (1) a location estimate is not received from the UE or (2) a location estimate is received from the UE but the network decides not to use this location estimate. In this case, the network and/or the UE perform location processing to obtain a location estimate for the UE. The location processing includes appropriate signaling exchanges and processing to perform a position fix for the target UE. However, if a location estimate is received from the UE and the network decides to use this location estimate, then the location processing is bypassed or short circuited. This short circuit saves system resources and results in a faster response to the request for the location of the UE, both of which are highly desirable.

The short circuit may advantageously be used for a single-shot location request as well as periodic location reporting in which the location of the UE is reported to the client entity at different instants in time based on periodic location information that indicates when to report the UE location to the client entity. This periodic location information may convey a specific schedule (e.g., location reporting at fixed intervals) and/or certain events whose occurrence trigger location reporting.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1A:
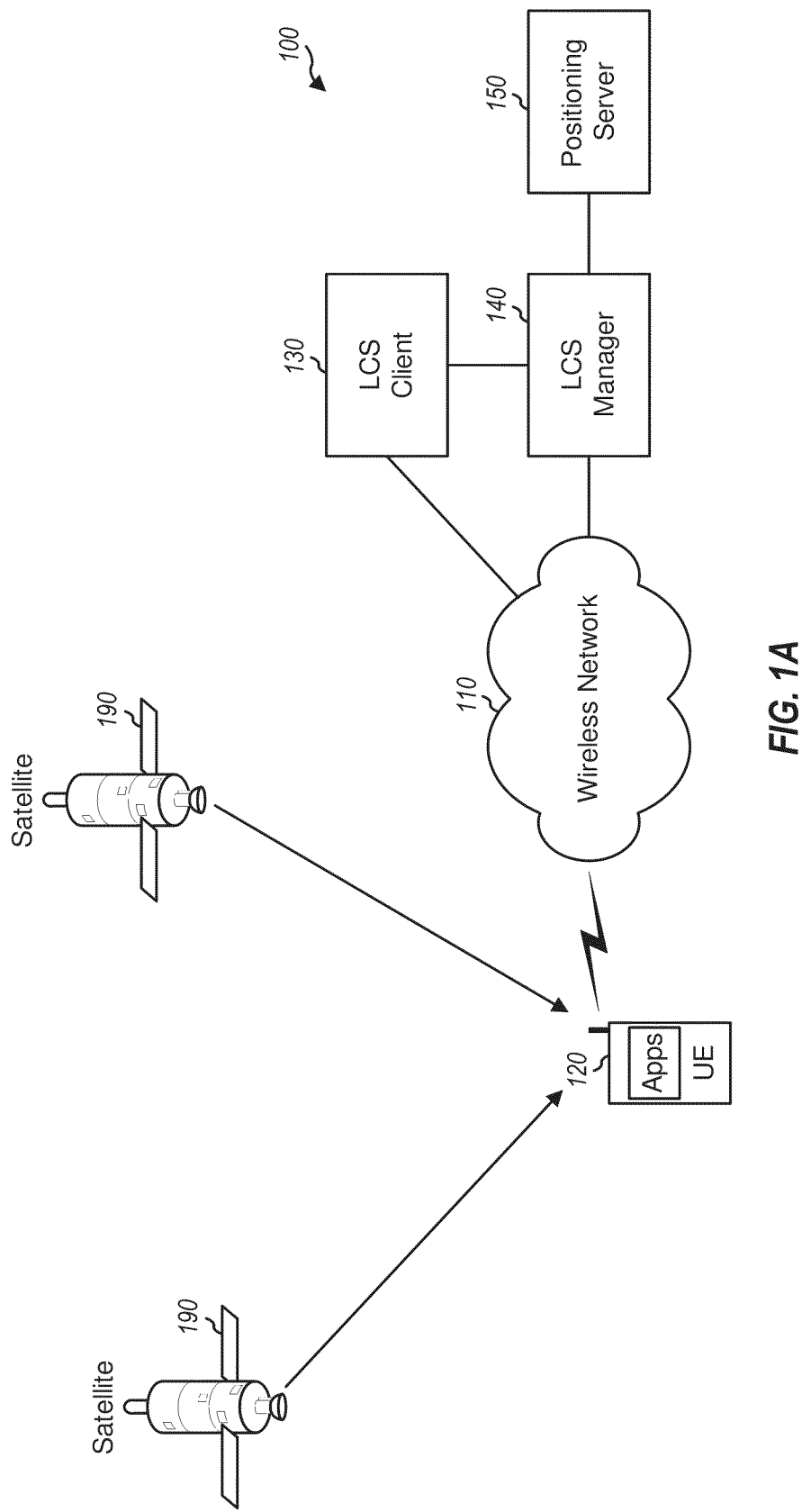
FIG. 1A shows a diagram of a network based on a user plane architecture.

FIG. 1A shows a diagram of a network 100 that is based on a user plane architecture and can efficiently provide location services. Network 100 includes a wireless network 110 that provides wireless communication for wireless devices located throughout the coverage area of the wireless network. For simplicity, only one wireless device 120 is shown in FIG. 1A. A wireless device may be fixed or mobile and may also be called a user equipment (UE), a mobile station, a terminal, a subscriber unit, or some other terminology. Examples of wireless devices include, but are not limited to, cellular phones, laptops, personal digital assistants (PDAs), telemetry devices, tracking devices, and so on.

Wireless network 110 may be a Code Division Multiple Access (CDMA) network, a Time Division Multiple Access (TDMA) network, a Frequency Division Multiple Access (FDMA) network, an Orthogonal Frequency Division Multiple Access (OFDMA) network, or some other multiple access network. Wireless network 110 may also be a network supporting a combination of the aforementioned technologies or a network with wide area network (WAN) coverage wireless as well as local area network (WLAN) coverage. A CDMA network may implement one or more CDMA radio access technologies (RATs) such as Wideband-CDMA (W-CDMA) and cdma2000. cdma2000 covers IS-2000, IS-856, and IS-95 standards. A TDMA network may implement one or more TDMA RATs such as Global System for Mobile Communications (GSM) or IS-136. These various RATs and standards are well known in the art. W-CDMA and GSM are described in documents from a consortium named "3rd Generation Partnership Project" (3GPP), and W-CDMA is part of Universal Mobile Telecommunication System (UMTS). cdma2000 is described in documents from a consortium named "3rd Generation Partnership Project 2" (3GPP2). 3GPP and 3GPP2 documents are publicly available. For clarity, certain aspects are specifically described below for UMTS. Wireless device 120 is called UE 120 (3GPP terminology) in the following description.

UE 120 may communicate with one or more base stations in network 100 and may also receive signals from other base stations in the network. UE 120 may also receive signals from various satellites, such as satellites 190 in a Global Positioning System (GPS). GPS is a constellation of 24 active and some spare satellites that circle the earth in well-spaced orbits. Satellites 190 may also be for other satellite positioning systems such as the European Galileo system or the Russian Glonass system. UE 120 may measure signals from base stations in network 100 and/or satellites 190 and may obtain pseudo-range measurements for these base stations and satellites. These measurements may be used to compute a position estimate for the UE.

In network 100, a location services (LCS) client 130 is a function or an entity that requests location information for LCS targets. An LCS target is a UE whose position is being sought. In general, an LCS client may reside in a network entity or a UE or may be external to both the network and any UE. An LCS manager 140 communicates with wireless network 110, LCS client 130, and a positioning server 150. LCS manager 140 provides various services such as subscriber privacy, authorization, authentication, billing, and so on. Positioning server 150 provides positioning or position determination services and supports UE-based, UE-assisted, and network-based positioning modes. "Positioning" and "position determination" are synonymous and refer to a functionality that detects or determines a geographical location of a target UE. In the UE-based positioning mode, the position of a UE is determined by the UE, possibly with assistance data from positioning server 150. In the UE-assisted positioning mode, the position of a UE is determined by positioning server 150 with assistance (e.g., measurements) from the UE. In the network-based positioning mode, the position of a UE is determined from information obtained by or already known to the network without any special assistance from the UE.

The UE-based and UE-assisted positioning modes may utilize various position determination methods such as GPS, assisted GPS (A-GPS), hybrid, advanced forward link trilateration (A-FLT), enhanced observed time difference (E-OTD), observed time difference of arrival (OTDOA), and so on. The network-based positioning mode may utilize position determination methods such as uplink time of arrival (U-TOA), uplink time difference of arrival (U-TDOA), cell-ID, enhanced cell-ID, and so on. In addition, positioning determination methods from more than one positioning mode may be employed in combination. The GPS and A-GPS methods derive a position estimate for a UE based solely on satellite measurements and have high accuracy. The hybrid method derives a position estimate based on both satellite and base station measurements and has high accuracy and high reliability. The A-FLT, E-OTD, and OTDOA methods derive a position estimate based on measurements of base station timing by a UE and have more intermediate accuracy. The U-TOA and U-TDOA methods derive a position estimate based on measurements by the network of UE timing and have more intermediate accuracy. The cell-ID and enhanced cell-ID methods derive a position estimate based on a cellular network and have coarser accuracy. These various position determination methods are known in the art.

For simplicity, FIG. 1A mainly shows network entities that are pertinent for position determination. These network entities may also be referred to by other names in other networks and other architectures. For example, in a Secure User Plane Location (SUPL) architecture promulgated by Open Mobile Alliance (OMA), LCS manager 140 is called a SUPL location center (SLC), LCS client 130 is called a SUPL enabled terminal (SET), and positioning server 150 is called a SUPL positioning center (SPC). LCS manager 140 may also be called an LCS server, a location server, a mobile positioning center (MPC), and so on. Positioning server 150 may also be called a positioning entity, a positioning center, a position determination entity (PDE) and so on. In general, a network may include any collection of network entities that can provide any range of services.

FIG. 1A shows a specific architecture for network 100. In this architecture, UE 120 and positioning server 150 exchange messages via LCS manager 140, which acts as a proxy for these two entities. Positioning server 150 may communicate with LCS manager 140 using one interface (e.g., an Llp interface) and may communicate with UE 120 via LCS manager 140 using another interface (e.g., an Lup interface). Positioning server 150 may also communicate with UE 120 directly (in non-proxy mode) and not via LCS Manager 140 using such protocols as RRLP (Radio Resource LCS Protocol). Other architectures with other interfaces between the various network entities may also be used for network 100.

Network 100 utilizes a user plane to support position determination. A user plane is a mechanism for carrying data for higher-layer applications and employs a user-plane bearer, which is typically implemented with various protocols such as User Datagram Protocol (UDP), Transmission Control Protocol (TCP), and Internet Protocol (IP), all of which are well known in the art. A control plane (which is also commonly called a signaling plane) is a mechanism for carrying signaling for higher-layer applications and may be implemented with network-specific protocols and signaling messages. Messages supporting location services and positioning are carried as part of signaling in a control plane architecture and as part of data in a user plane architecture. The content of the messages may, however, be similar or even identical in both types of architecture.

Figure 1B:
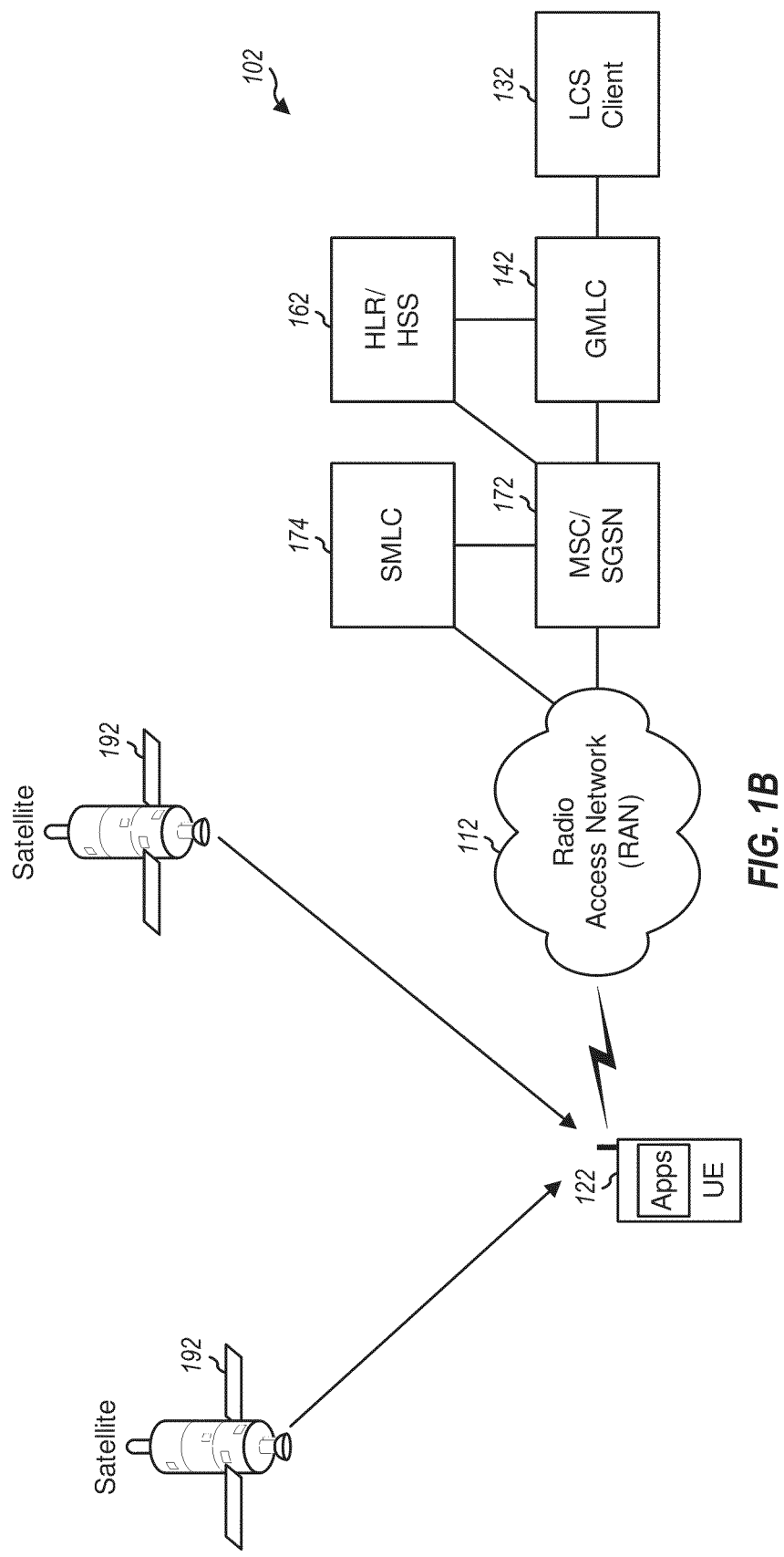
FIG. 1B shows a diagram of a network based on a control plane architecture.

FIG. 1B shows a diagram of a network 102 that is based on a control plane architecture and can also efficiently provide location services. Network 102 may be part of a public land mobile network (PLMN). A UE 122 communicates with a radio access network (RAN) 112 and may also receive signals from satellites 192. RAN 112 provides wireless communication for wireless devices (e.g., UE 122) located throughout the coverage area of the RAN. RAN 112 may be a second generation (2G) GSM EDGE Radio Access Network (GERAN) or a third generation (3G) Universal Terrestrial Radio Access Network (UTRAN). RAN 112 communicates with a mobile services switching center (MSC) and/or a serving GPRS support node (SGSN) (MSC/SGSN) 172. MSC 172 performs switching functions for circuit-switched calls (e.g., setup, routing, and eventual release of circuit-switched voice and data calls) for UEs within its coverage area. MSC 172 may act as a visited MSC (VMSC) and may be an MSC server. SGSN 172 performs switching and routing functions for packet-switched calls and packet-switched connections.

A gateway mobile location center (GMLC) 142 is equivalent to LCS manager 140 in network 100 and provides various services such as subscriber privacy, authorization, authentication, billing, and so on. GLMC 142 communicates with MSC/SGSN 172, an LCS client 132, and a home location register (HLR)/home subscriber server (HSS) 162. LCS client 132 is equivalent to LCS client 130 in network 100 and is a function or an entity that requests location information for LCS targets. HLR/HSS 162 stores registration information for UEs (e.g., UE 122) that are subscribers of the wireless network covered by the HLR/HSS. HLR/HSS 162 communicates with GLMC 142 and MSC/SGSN 172. A serving mobile location center (SMLC) 174 is equivalent to positioning server 150 in network 100, provides position determination services, and supports UE-based, UE-assisted and network-based positioning modes. SMLC 174 may communicate with MSC/SGSN 172 and/or RAN 112 and may in some cases be a physical and/or logical part of MSC/SGSN 172 or RAN 112. The network entities in network 102 are described in 3GPP TS 23.271, entitled "Functional stage 2 description of Location Services (LCS) (Release 6)," in 3GPP TS 25.305, entitled "Stage 2 functional specification of User Equipment (UE) positioning in UTRAN (Release 6)," and in 3GPP TS 43.059, entitled "Functional stage 2 description of Location Services (LCS) in GERAN (Release 6)," which are publicly available.

For simplicity, FIGS. 1A and 1B show the UE communicating with a home network, and only one instance of each network entity is shown in FIGS. 1A and 1B. The UE may be roaming and may communicate with a visited network. In this case, the UE may communicate with a serving MSC/SGSN in the visited network, which may communicate with a visited GMLC (V-GMLC). The V-GMLC may communicate with a home GMLC (H-GMLC) in the home network and/or a requesting GMLC (R-GMLC) in a network associated with the LCS client that is neither the home network nor visited network. Thus, there may be multiple instances of a given network entity (e.g., the GMLC) in different networks when the UE is roaming or when the LCS client is not associated with the home network. Appropriate signaling is passed between the various network entity instances to achieve the desired result.

The position of UE 120 in FIG. 1A or UE 122 in FIG. 1B may be requested by (1) applications (Apps) running at the UE, which results in UE-initiated position determination, and (2) applications running at LCS client 130 or 132, which results in network-initiated position determination. In general, network-initiated and UE-initiated position determination may be triggered by various entities, applications, and events. Network-initiated position determination is also referred to as mobile terminated location request (MT-LR) when the LCS client is external to the network (e.g., not associated with MSC/SGSN 172), or network induced location request (NI-LR) when the LCS client lies inside any of the PLMN entities currently serving the target UE (e.g., MSC/SGSN 172). UE-initiated position determination is also referred to as mobile originated location request (MO-LR). For clarity, some exemplary call flows for network-initiated and UE-initiated position determination are described below.

Figure 2A:
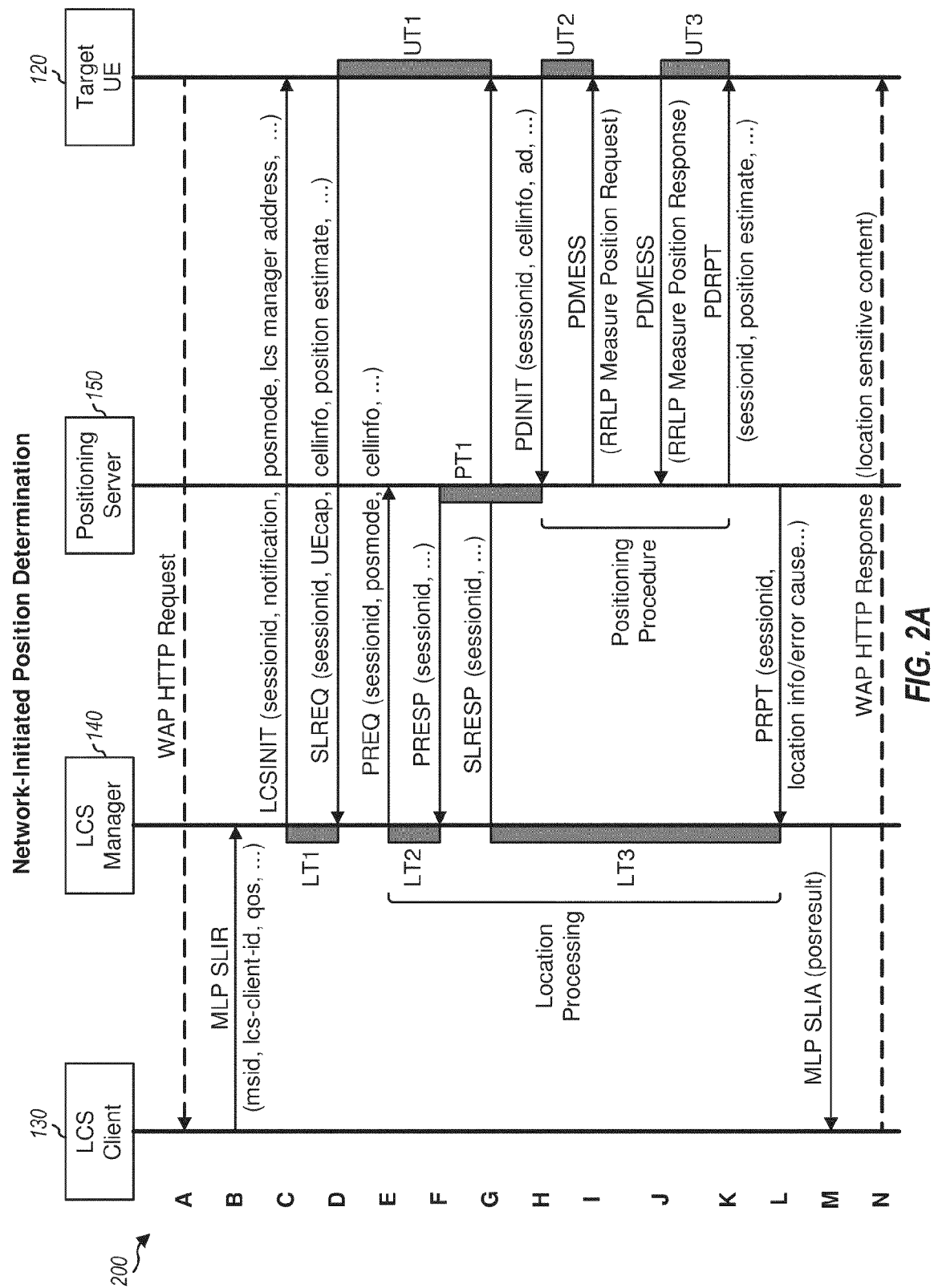
FIG. 2A shows a call flow for network-initiated position determination in a network with a user plane architecture.

FIG. 2A shows an exemplary call flow 200 for network-initiated position determination in network 100 shown in FIG. 1A with a user plane architecture according to the pre-SUPL standard developed by OMA. For call flow 200, UE 120 is a target UE whose position is being sought. Positioning server 150 serves the geographic area associated with the target UE 120.

A wireless user at UE 120 executes a Wireless Application Protocol (WAP) application (or some other browser application), browses a website, and requests location sensitive content by sending a WAP Hyper Text Transfer Protocol (HTTP) Request to LCS client 130 via wireless network 110 (step A). Step A may or may not be present for network-initiated position determination. In general, position determination may be initiated on the network side by various entities and/or in response to various events.

LCS client 130 receives the WAP HTTP Request and determines that the position of UE 120 is needed in order to provide the appropriate content. LCS client 130 then sends a Mobile Location Protocol (MLP) Standard Location Immediate Request (SLIR) message to LCS manager 140 to request for an immediate position fix for UE 120 (step B). MLP is one signaling protocol that may be used for the communication between LCS client 130 and LCS manager 140, and other signaling protocols may also be used for this interface. An immediate location request is a request for a position estimate of a target UE as soon as possible. The MLP SLIR message may contain, e.g., an identifier for UE 120 ("msid"), an identifier for LCS client 130 (lcs-client-id), a location quality of service (QoS) (denoted as "qos" in FIG. 2A), and so on. The location QoS may indicate the required accuracy for the position fix for the target UE and the allowed response time.

LCS manager 140 receives the MLP SLIR message, authenticates LCS client 130 based on the lcs-client-id, and determines if LCS client 130 is authorized for the requested service (also step B). LCS manager 140 may perform a subscriber privacy check to determine whether a position fix is permitted for the UE (also step B). This check may be performed based on (1) the lcs-client-id, msid, qos, and so on, included in the received MLP SLIR message and (2) profile or subscriptions for subscribers, which are typically the wireless user at the UE and the LCS client. A wireless user, subscriber or LCS client typically needs to be provisioned in order to obtain communication and/or location services, and the information for the subscriber or LCS client is typically stored in a profile or subscription. If the subscriber privacy check passes, then the remaining steps for call flow 200 continue as described below. Otherwise, if the subscriber privacy check fails, then LCS manager 140 does not authorize LCS client 130 for the requested service, call flow 200 terminates early and jumps to step M, and LCS manager 140 returns an applicable MLP return code.

If all of the applicable checks pass in step B, then LCS manager 140 initiates location processing with UE 120 by sending an LCSINIT message to the UE (step C). The LCSINIT message may contain, e.g., a session identifier ("sessionid"), a notification, a positioning mode ("posmode"), an address for LCS manager 140 ("lcs manager address"), and so on. The session identifier is used to unambiguously identify the communication between the network and the UE for the location request. The notification is a two-part parameter that indicates (1) whether to perform notification to inform the wireless user of the location request and (2) whether to perform verification to obtain consent from the wireless user for the location request. The notification parameter typically includes some pertinent text for notification. The positioning mode indicates which mode to use for position determination, e.g., UE-based, UE-assisted, or network-based positioning mode. The LCSINIT message may be implemented as a WAP PUSH trigger to start the location processing. LCS manager 140 starts a timer LT1 upon sending the LCSINIT message (also step C). The LT1 timer is used to timeout the location processing if a response is not received from UE 120 prior to expiration of the timer.

UE 120 receives the LCSINIT message from LCS manager 140. If notification or verification is required, as indicated by the notification parameter in the LCSINIT message, then UE 120 provides popup text or some other display or warning (e.g., tone or vibration) to notify the wireless user of the entity requesting location information for the UE. The popup text may be generated based on the lcs-client-id and text included in the received LCSINIT message. If verification is required, then the wireless user is queried to either grant or deny the location request.

If the wireless user grants the location request, then UE 120 prepares for location processing by retrieving various types of information that are pertinent for position determination such as, e.g., the current cell information ("cellinfo") and the UE capabilities ("UEcap"). The cell information may be used to provide appropriate assistance data for the UE. The UE capabilities may be used to determine which positioning mode to use to perform a position fix for the UE. UE 120 then sends a Start Location Request (SLREQ) message to LCS manager 140 to initiate a location session with the LCS manager (step D). This SLREQ message may contain, e.g., the sessionid, cell information, selected positioning mode, UE capabilities, and so on.

If the wireless user denies the location request, then UE 120 sends a Start Location Reject (SLREJ) message to LCS manager 140 (not shown in FIG. 2A). The SLREJ message may contain a denial indication and/or other parameters. The SLREJ message ends the communication between UE 120 and LCS manager 140 for this location request. The description below assumes that UE 120 sends an SLREQ message.

The LCSINIT message essentially asks UE 120 for permission to perform a position fix for the UE and readies the UE for location processing. UE 120 normally responds by returning (1) either a grant or a denial of the location request and (2) if the location request is granted, pertinent information used to perform the position fix for the UE. For network-initiated position determination, LCS manager 140 does not expect UE 120 to have location information for itself Conventionally, location processing is performed for each granted location request.

In many instances, UE 120 may already have a position estimate for itself This position estimate may be a cached position estimate that was obtained, e.g., by performing a position fix for a prior location request, which may have been initiated by the network or the UE. This cached position estimate may have been obtained using the UE-based, UE-assisted, or network-based positioning mode and may be an accurate or a coarse estimate. UE 120 may also be able to derive a new position estimate for itself using the UE-based positioning mode. The available position estimate at UE 120 may thus be a cached position estimate or a new position estimate.

In an embodiment, UE 120 selectively (or optionally) includes its position estimate in the SLREQ message sent to LCS manager 140 if this position estimate is available. For this embodiment, UE 120 has the discretion to include or omit the position estimate. In another embodiment, UE 120 may include its position estimate in the SLREQ message only if certain criteria imposed by the network and/or the UE are satisfied. For example, UE 120 may include its position estimate only if (1) an immediate position fix is being requested, (2) the UE is allowed to use the UE-based positioning mode, and (3) the position estimate can be obtained without any interaction with the network. Other criteria or combinations of criteria may also be imposed. In any case, subject to satisfaction of all required criteria, if any, UE 120 may include its position estimate in the SLREQ message even if LCS manager 140 did not request for this position estimate. UE 120 starts a timer UT1 upon sending the SLREQ message (also step D). This timer is used to timeout the location processing if a response is not received from LCS manager 140 prior to expiration of the timer.

LCS manager 140 receives the SLREQ message from UE 120 and stops the LT1 timer upon receiving this message (also step D). LCS manager 140 extracts the parameters included in the received SLREQ message. If the position estimate for UE 120 is included in the SLREQ message, then LCS manager 140 may or may not use this position estimate. LCS manager 140 may make this determination based on various factors such as, e.g., the accuracy (or uncertainty) of the position estimate, the LCS QoS required by LCS client 130, the age of the location information, the subscriber profile, and so on. If LCS manager 140 decides to use the position estimate provided by UE 120, then call flow 200 performs step G and then proceeds to step M, as described below.

LCS manager 140 initiates location processing for UE 120 if (1) a position estimate is not included in the SLREQ message sent by the UE or (2) a position estimate is included in the SLREQ message but the LCS manager decides not to use this position estimate. LCS manager 140 initiates the location processing by sending a Position Request (PREQ) message to positioning server 150 (step E). This PREQ message may contain, e.g., the sessionid, the posmode, the cellinfo, and so on. LCS manager 140 starts a timer LT2 upon sending the PREQ message (also step E). The LT2 timer is used to timeout the communication with positioning server 150 if a response is not received from the positioning server prior to expiration of the timer.

Positioning server 150 receives the PREQ message from LCS manager 140 and sends back a Position Response (PRESP) message (step F). The PRESP message may contain, e.g., the sessionid. The PRESP message confirms to LCS manager 140 that positioning server 150 is ready to process the location request identified by the sessionid. Positioning server 150 starts a timer PT1 upon sending the PRESP message (also step F). The PT1 timer is used to timeout the position determination for this sessionid if a message is not received from target UE 120 prior to expiration of the timer.

LCS manager 140 receives the PRESP message from positioning server 150 and stops the LT2 timer (also step F). LCS manager 140 then sends a Start Location Response (SLRESP) message to UE 120 to initiate a positioning procedure (step G). The positioning procedure includes appropriate signaling exchanges and pertinent processing to obtain a position estimate for the target UE. The SLRESP message may contain, e.g., the sessionid and possibly other information. The SLRESP message informs UE 120 that positioning server 150 is ready to perform a position fix for the UE. LCS manager 140 starts a timer LT3 upon sending the SLRESP message (also step G). The LT3 timer is used to timeout the communication with positioning server 150 if a response is not received from the positioning server prior to expiration of this timer.

UE 120 receives the SLRESP message from LCS manager 140 and stops the UT1 timer (also step G). UE 120 then starts the positioning procedure by sending a Position Determination Initiation (PDINIT) message either directly to positioning server 150 (e.g., for a non-proxy mode, as shown in FIG. 2A) or via LCS manager 140, which forwards the message to positioning server 150 (e.g., for a proxy mode, which is not shown in FIG. 2A) (step H). This PDINIT message may contain, e.g., the sessionid, the cellinfo (e.g., the identifier of the cell in which UE 120 is located), request for assistance data (ad), a coarse position estimate for the UE, and so on. UE 120 starts a timer UT2 upon sending the PDINIT message (also step H). The UT2 timer is used to timeout the communication with positioning server 150 if a response is not received from the positioning server prior to expiration of this timer.

Positioning server 150 receives the PDINIT message from UE 120 and stops the PT1 timer (also step H). Positioning server 150 may then start a precise position determination procedure by sending a Position Determination Messaging (PDMESS) message that contains a Radio Resource LCS Protocol (RRLP) Measure Position Request message (step I). RRLP is one of multiple location services protocols that are available to perform a position fix with measurements, e.g., for GPS satellites. The RRLP Measure Position Request message may contain, e.g., a request for a position fix, assistance data, and so on.

UE 120 receives the PDMESS message from positioning server 150 and stops the UT2 timer (also step I). UE 120 then performs measurements appropriate for the selected positioning mode. For example, UE 120 may obtain (1) pseudo-range and/or time measurements for GPS satellites for an A-GPS position fix, (2) pseudo-range and/or time measurements for base stations for a terrestrial position fix, (3) measurements for both satellites and base stations for a hybrid position fix, (4) cell identifiers for a cell-ID based position fix, and so on. For the UE-based positioning mode, UE 120 further computes a position estimate based on the measurements. UE 120 then sends a PDMESS message that contains an RRLP Measure Position Response message directly to positioning server 150 (as shown in FIG. 2A) or via LCS manager 140, which forwards the message to positioning server 150 (not shown in FIG. 2A) (step J). The RRLP Measure Position Response message may contain the measurements made by the UE, a position estimate for the UE, and/or request for more assistance data. For the UE-assisted positioning mode, UE 120 starts a timer UT3 upon sending the PDMESS message (also step J). The UT3 timer is used to timeout the communication with positioning server 150 if a response is not received from the positioning server prior to expiration of this timer.

Positioning server 150 receives the PDMESS message from UE 120 (also step J). For the UE-based positioning mode, positioning server 150 uses the position estimate included in the received RRLP Measure Position Response message. For the UE-assisted positioning mode, positioning server 150 computes a position estimate for UE 120 based on the measurements included in the received message. For the UE-assisted positioning mode, positioning server 150 completes the positioning procedure by sending a Position Determination Report (PDRPT) message to UE 120 (step K). Positioning server 150 does not send a PDRPT message to UE 120 for the UE-based positioning mode. Positioning server 150 also sends a Position Report (PRPT) message to LCS manager 140 (step L). This PRPT message may contain, e.g., the sessionid, location information for UE 120, an error code (if applicable), and so on.

LCS manager 140 receives the PRPT message from positioning server 150 and stops the LT3 timer (also step L). LCS manager 140 extracts the location information for UE 120 from the received PRPT message and sends an MLP Standard Location Immediate Answer (SLIA) message to LCS client 130 (step M). This MLP SLIA message contains the requested position estimate for UE 120 (posresult) and possibly other pertinent information. LCS client 130 receives the MLP SLIA message and uses the position estimate for UE 120 to retrieve the location sensitive content requested by the wireless user. LCS client 130 then sends to UE 120 a WAP HTTP Response message containing this location sensitive content (step N). Steps A and N are present for a WAP call (e.g., to download location sensitive content) and may not be present for other instances of network-initiated position determination. Steps B and M in FIG. 2A are for a synchronous mode of MLP SLIR. For an asynchronous mode, a SLIA message is returned following step B, and a Standard Location Immediate Report (SLIREP) message is used in step M instead of the MLP SLIA message.

Figure 2B:
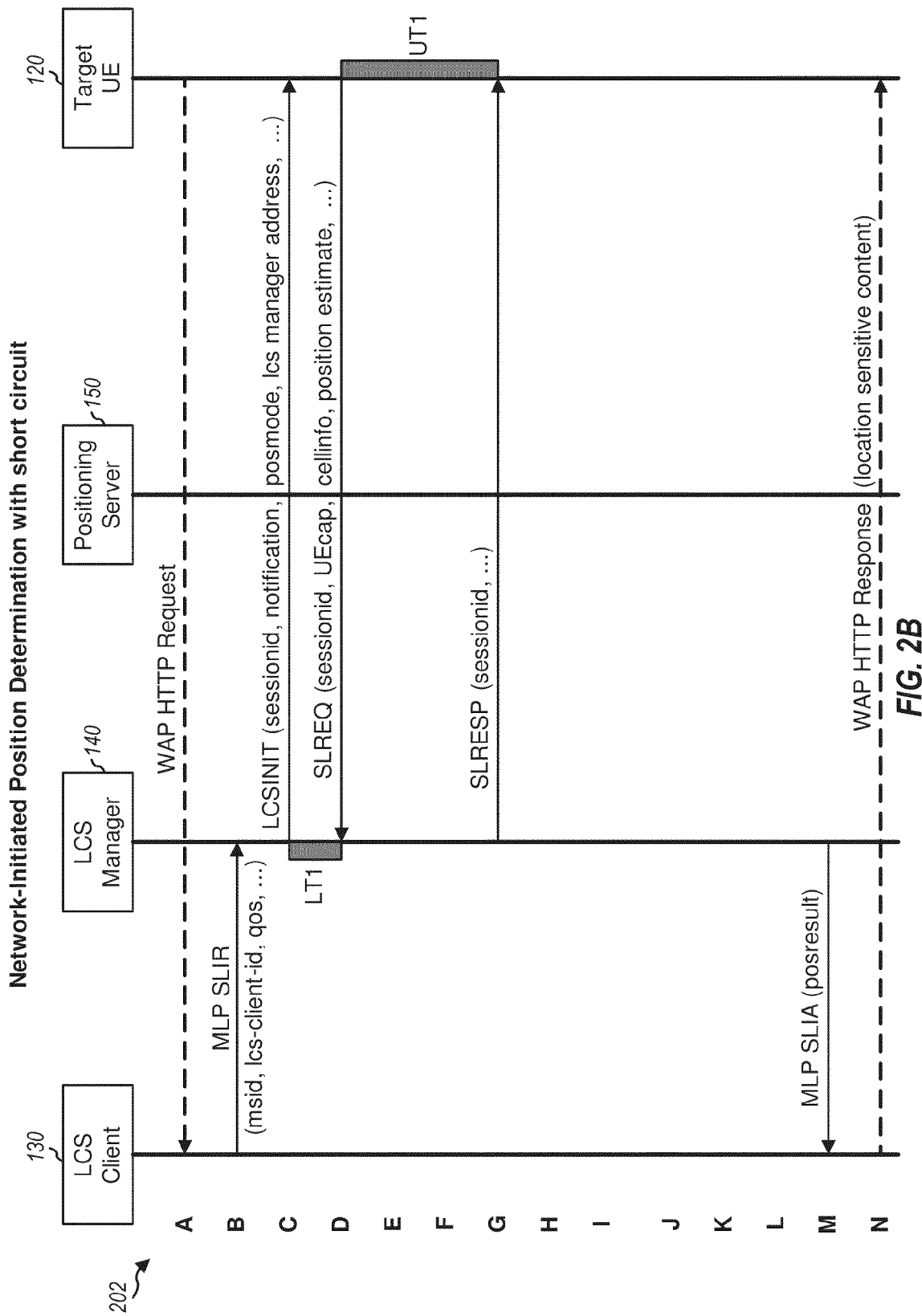
FIG. 2B shows the call flow in FIG. 2A with a short circuit for the location processing.

FIG. 2B shows a call flow 202 for network-initiated position determination with a short circuit for the location processing. Call flow 202 includes a subset of the steps in call flow 200 shown in FIG. 2A. Steps A through D in call flow 202 are the same as steps A through D in call flow 200. In step D, UE 120 sends an SLREQ message that contains a position estimate for the UE. LCS manager 140 receives the SLREQ message, decides to use the position estimate provided by the UE, and skips steps E and F. LCS manager 140 sends an SLRESP message to direct UE 120 not to initiate the positioning procedure (step G). Call flow 202 bypasses or short circuits the location processing in steps E and F and steps H through L. LCS manager 140 then sends to LCS client 130 an MLP SLIA message containing the position estimate provided by UE 120 (step M). As shown in FIG. 2B, system resources may be conserved and a faster response for the location request may be achieved by allowing UE 120 to include its position estimate in the SLREQ message.

Figure 3A:
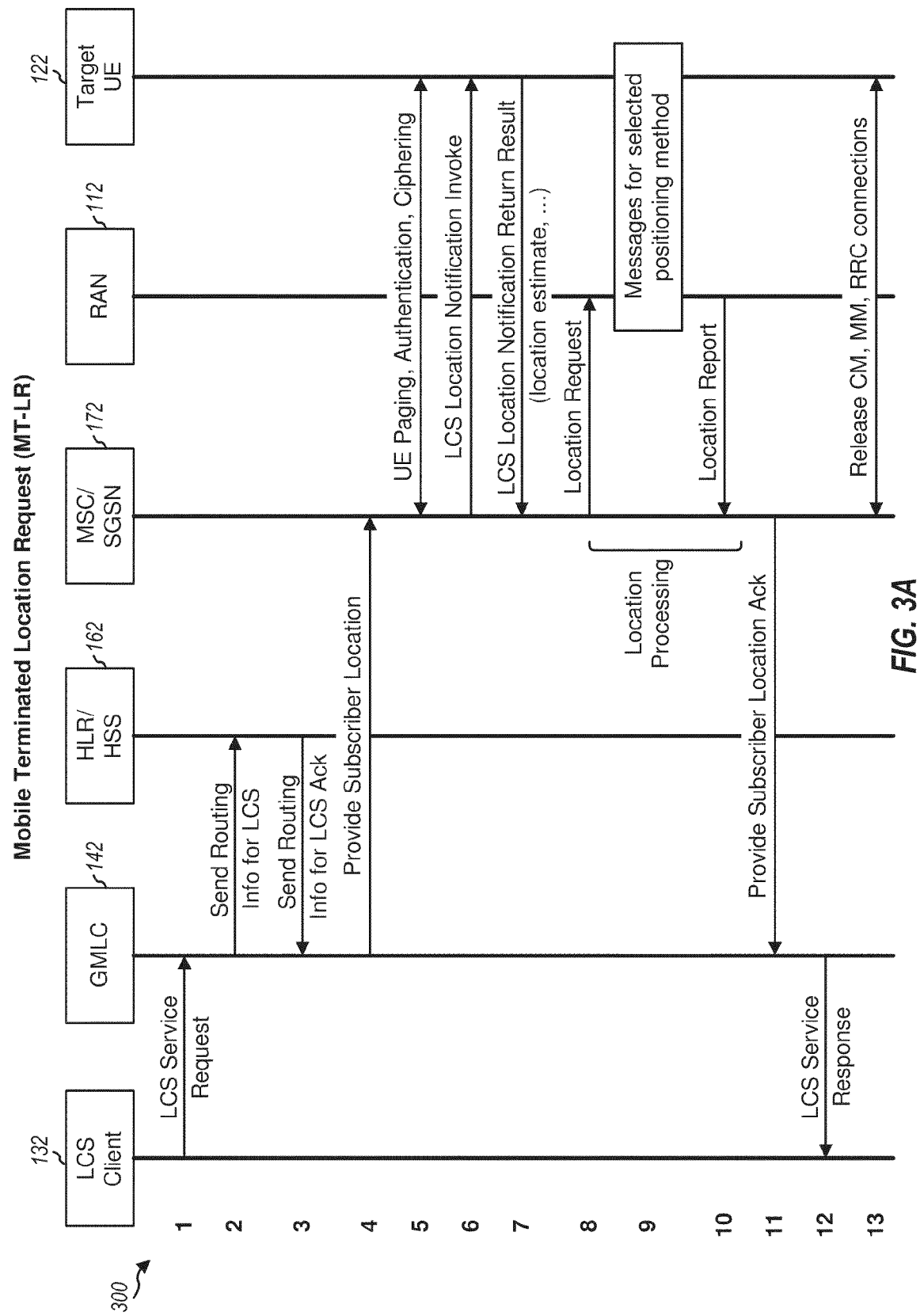
FIG. 3A shows a call flow for mobile terminated location request (MT-LR) in a network with a control plane architecture.

FIG. 3A shows an exemplary call flow 300 for mobile terminated location request (MT-LR) in network 102 shown in FIG. 1B with a control plane architecture. For call flow 300, LCS client 132 sends an LCS Service Request message to GMLC 142 to request the current location of target UE 122 (step 1). The LCS Service Request message might be, e.g., an MLP SLIR. GMLC 142 verifies the identity of LCS client 132, authenticates the LCS client, and determines whether the LCS client is authorized for the requested LCS service. If LCS client 132 is authorized, then GMLC 142 derives an identifier of target UE 122 and determines the LCS QoS from either subscription data for LCS client 132 and/or the subscriber of UE 122 or data supplied by LCS client 132. The UE identifier may be a Mobile Subscriber ISDN (MSISDN), which is a dialable number, or an International Mobile Subscriber Identity (IMSI), which is a non-dialable number. GMLC 142 then sends to HLR/HSS 162 a Send Routing Info for LCS message that contains the identifier of UE 122 (step 2).

HLR/HSS 162 verifies that GMLC 142 is authorized to request location information for UE 122. HLR/HSS 162 then returns to GMLC 142 a Send Routing Info for LCS Acknowledgment message that contains the address of MSC/SGSN 172 and the identifier of UE 122 (step 3). If GMLC 142 already knows both the MSC address and the UE identifier (e.g. from a previous location request), then steps 2 and 3 may be skipped.

GMLC 142 then sends a Provide Subscriber Location message to MSC/SGSN 172 using the address provided by HLR/HSS 162 (step 4). This message contains the type of location information requested (e.g., the current location), the UE identifier, the LCS QoS (e.g., the required accuracy and response time), an indication of whether LCS client 132 has override capability, and possibly other information.

MSC/SGSN 172 may authenticate GMLC 142 and verify that the location request is allowed (also step 4). If the location request is allowed, then MSC/SGSN 172 may invoke the wireless network to perform paging, authentication and ciphering of UE 122 (step 5). UE 122 may provide its capabilities, e.g., the UE-based and/or UE-assisted positioning modes supported by the UE (also step 5).

MSC/SGSN 172 may send an LCS Location Notification Invoke message to UE 122 (step 6). This message indicates the type of location request (e.g., the current location), the identity of LCS client 132, and whether privacy verification is required. UE 122 notifies the wireless user of the location request. If privacy verification was requested, then UE 122 queries the wireless user regarding the location request and waits for the user to grant or deny permission. UE 122 then sends an LCS Location Notification Return Result message to MSC/SGSN 172 (step 7). This message indicates, in the case that privacy verification was requested in step 6, whether permission is granted or denied and optionally includes a location estimate for UE 122. UE 122 may provide its location estimate, if available, even if MSC/SGSN 172 did not request for this information. The location estimate may be used to short circuit the subsequent location processing, as described below. Alternatively, UE 122 may send an LCS Location Notification Return Result without a location estimate.

MSC/SGSN 172 sends a Location Request message to RAN 112 (step 8). This message contains the type of location information requested, the UE capabilities, and the LCS QoS. RAN 112 selects an appropriate positioning mode to use based on the location request, the required accuracy, and the UE capabilities. RAN 112 then initiates an appropriate message sequence for the selected positioning mode (step 9). For example, the message sequence may include steps similar or identical to one or more of steps H through K in FIG. 2A for an A-GPS positioning procedure. UE 122 performs any required measurements and reports either the measurements obtained by the UE or a location estimate computed by the UE based on the measurements. RAN 112 receives the report from UE 122 and, for the UE-assisted positioning mode, computes a location estimate for the UE based on the received measurements. RAN 112 may also or instead obtain measurements related to the location of UE 122 from entities within, or associated with, RAN 112 and may compute a location estimate based in part or in whole on these measurements. RAN 112 then sends to MSC/SGSN 172 a Location Report message that contains the location estimate for UE 122 (step 10).

MSC/SGSN 172 then sends to GMLC 142 a Provide Subscriber Location Acknowledgment message that contains the location estimate for UE 122 and possibly other pertinent information (step 11). GMLC 142 then sends to LCS client 132 an LCS Service Response message, e.g. an MLP SLIA message that contains the location estimate for UE 122 (step 12). MSC 172 may release the Connection Management (CM), Mobility Management (MM) or GPRS Mobility Management (GMM), and Radio Resource Control (RR/RRC) connections to UE 122, if the UE was previously idle (step 13).

Most of call flow 300 is described in documents 3GPP TS 23.171 version 3.11.0 (March 2004) and 3GPP TS 23.271 version 6.10.0 (December 2004), both of which are publicly available. However, these versions of the 3GPP standards do not allow the target UE to provide its location estimate in step 7. These versions of the 3GPP standards require the entire call flow 300 to be performed for each location request, even if the target UE already has a suitable location estimate.

Figure 3B:
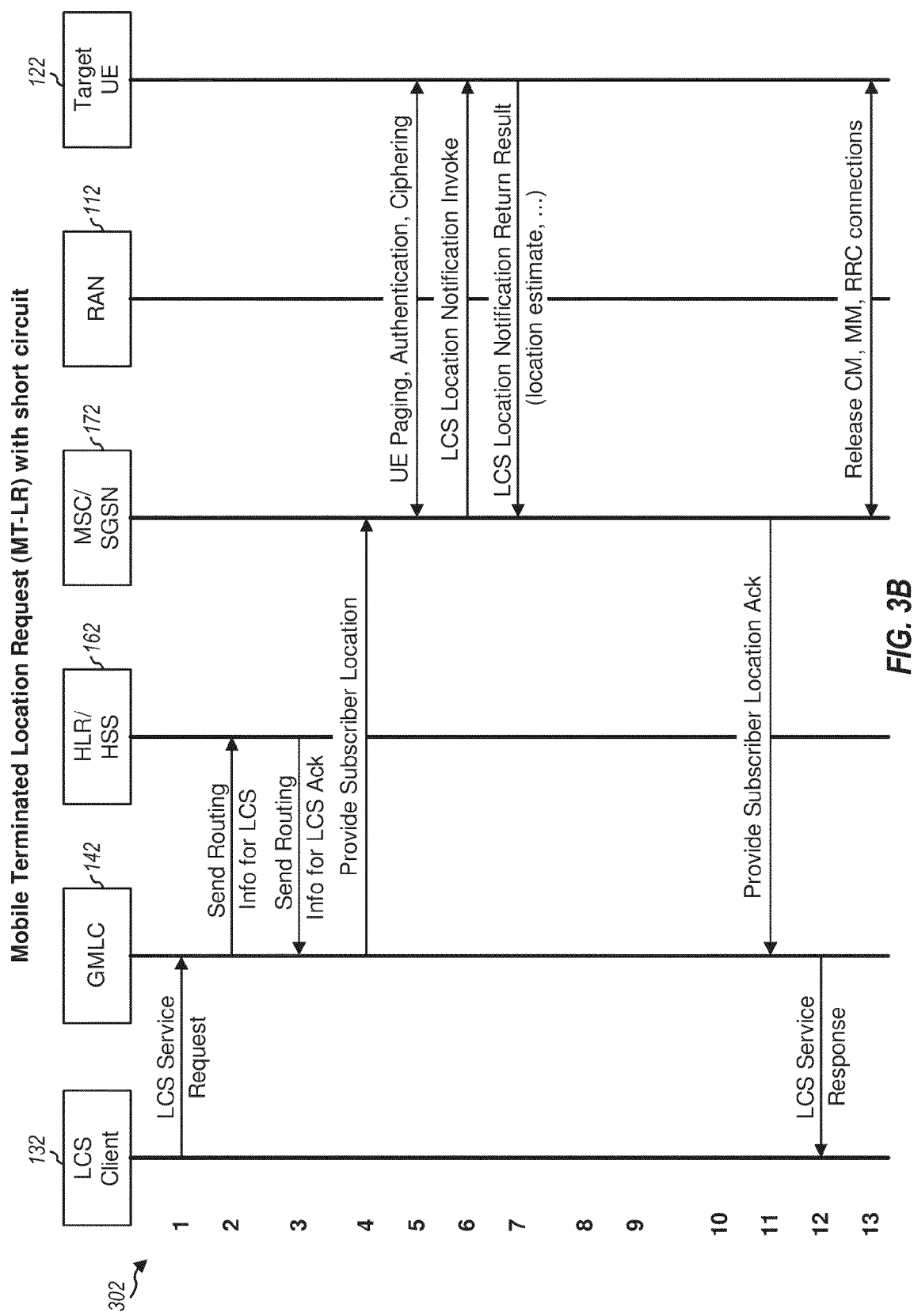
FIG. 3B shows the call flow in FIG. 3A with a short circuit for the location processing.

FIG. 3B shows another call flow 302 for mobile terminated location request (MT-LR) with a short circuit for the location processing. Call flow 302 includes a subset of the steps in call flow 300 shown in FIG. 3A. Steps 1 through 7 in call flow 302 are the same as steps 1 through 7 in call flow 300. In step 6, MSC/SGSN 172 sends a LCS Location Notification Invoke message to UE 122 even if this message is not needed to support notification and/or verification (permission/denial) by the UE subscriber. In step 7, UE 122 sends an LCS Location Notification Return Result message that contains a location estimate for the UE. MSC/SGSN 172 receives this message and decides to use the location estimate provided by UE 122. By allowing the target UE to provide its location estimate along with the consent/verification within the notification response in step 7, the UMTS network can bypass steps 8 through 10 in call flow 300 and provide this location estimate to LCS client 132 in steps 11 and 12. This can save system resources and provide a faster response for the location request by the LCS client.

Figure 4A:
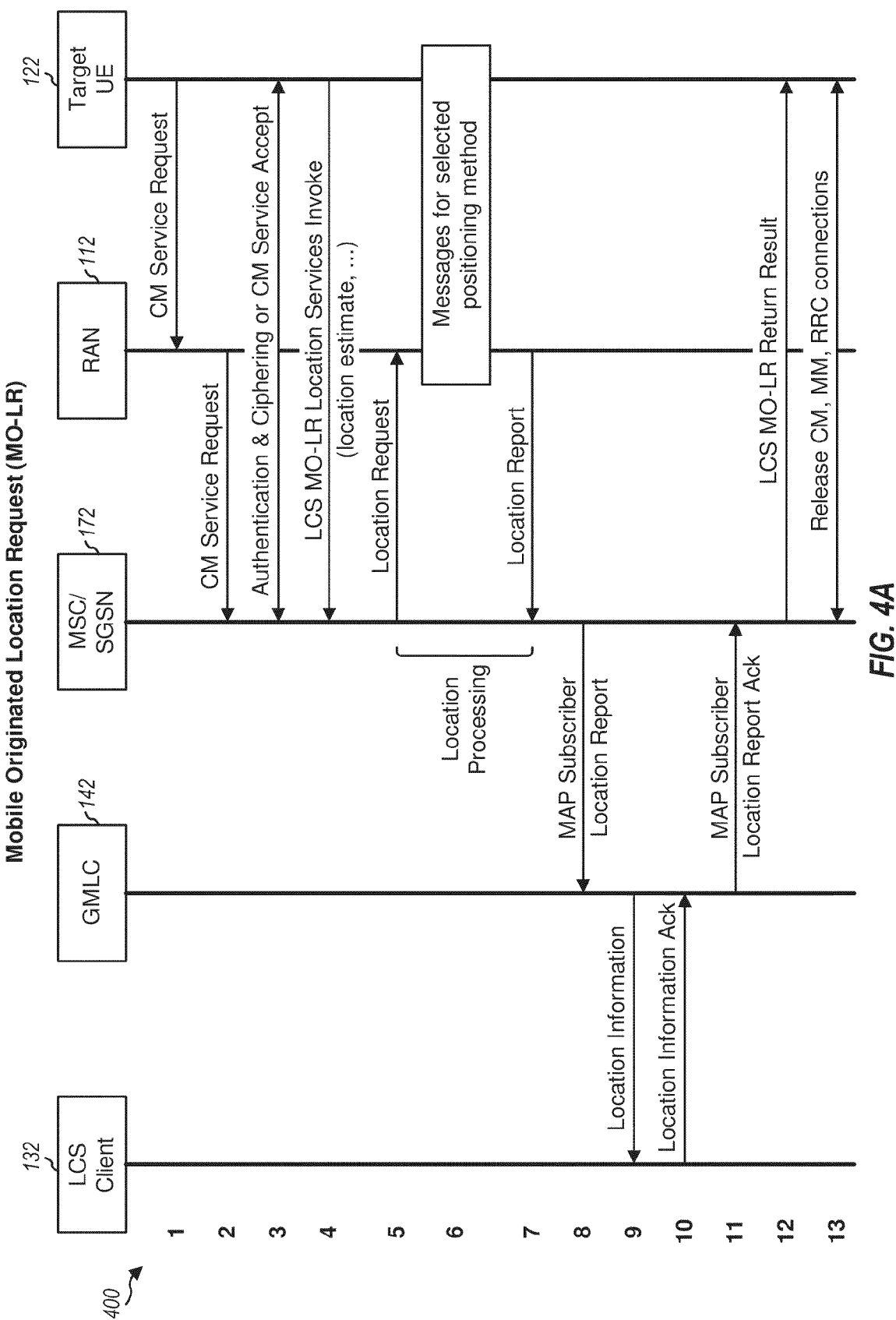
FIG. 4A shows a call flow for mobile originated location request (MO-LR) in a network with a control plane architecture.

FIG. 4A shows an exemplary call flow 400 for mobile originated location request (MO-LR) in network 102 shown in FIG. 1B with a control plane architecture. UE 122 may use all or part of call flow 400 to (1) request its own location for basic self location, (2) request location assistance data for autonomous self location, (3) request a transfer of its own location to another LCS client for a transfer to a third party, and (4) achieve other results.

For call flow 400, UE 122 sends to MSC/SGSN 172 via RAN 112 a Connection Management (CM) Service Request message that indicates a request for a call independent supplementary service (steps 1 and 2). MSC/SGSN 172 instigates authentication and ciphering if UE 122 was in an idle mode or returns a Direct Transfer CM Service Accept message if UE 122 was in a dedicated mode (step 3). UE 122 may provide its capabilities, e.g., the UE-based and/or UE-assisted positioning modes supported by the UE (also step 3). For clarity, steps 1 through 3 are for a circuit switched (CS) domain connection setup in which signaling is sent to the MSC. Steps 1 through 3 would be different for a packet switched (PS) domain connection setup.

UE 122 then sends to MSC/SGSN 172 an LCS MO-LR Location Services Invoke message to request a desired location service (e.g., to request for location of the UE, location assistance data, transfer of the UE location to another LCS client, and so on) (step 4). The LCS MO-LR Location Services Invoke message contains parameters pertinent for the desired location service such as, e.g., the LCS QoS (e.g., accuracy and response time), the identity of the LCS client, the type of assistance data desired, and so on. UE 122 may also provide its location estimate, if available, in the LCS MO-LR Location Services Invoke message, as shown in FIG. 4A. This location estimate may be used to short circuit the subsequent location processing, as described below. Alternatively, UE 122 may send an LCS MO-LR Location Services Invoke message without a location estimate.

MSC/SGSN 172 verifies that UE 122 is authorized for the requested location service based on a subscription profile for the UE (also step 4). If the location request is authorized, then MSC/SGSN 172 sends to RAN 112 a Location Request message that contains the type of location information requested, the UE capabilities, and the LCS QoS (step 5). RAN 112 selects an appropriate positioning mode to use based on the location request, the required accuracy, and the UE capabilities. RAN 112 then initiates an appropriate message sequence for the selected positioning mode (step 6). Step 6 in call flow 400 is analogous to step 9 in call flow 300 in FIG. 3A. RAN 112 receives a report with measurements or a location estimate for the UE, from the UE and/or from elements within or associated with RAN 112, computes a location estimate for the UE if needed, and sends to MSC/SGSN 172 a Location Report message that contains the location estimate for the UE (step 7). If the MO-LR Location Services Invoke message in step 4 had instead requested location assistance data for autonomous self-location, then RAN 112 would instead transfer assistance data to UE 122 in step 6 and not return a location estimate in step 7.

If UE 122 requests a transfer of its location estimate to LCS client 132, then MSC/SGSN 172 sends to GMLC 142 a Mobile Application Part (MAP) Subscriber Location Report message that contains the location estimate for the UE and possibly other pertinent information (step 8). GMLC 142 then sends the location information to LCS client 132 (step 9). LCS client 132 responds by sending a location information acknowledgment to GMLC 142 (step 10). GMLC 142 then sends a MAP Subscriber Location Report Acknowledgment message to MSC/SGSN 172 to acknowledge receipt of the location estimate (step 11). Steps 8 through 11 may be omitted, or some other steps may be performed, for other types of location services requested by UE 122.

MSC/SGSN 172 sends to UE 122 an LCS MO-LR Return Result message that contains a location estimate (if requested by the UE) and possibly other pertinent information (step 12). MSC/SGSN 172 may release the CM, MM or GMM, and RR/RRC connections to UE 122, if the UE was previously idle (step 13).

Most of call flow 400 is also described in documents 3GPP TS 23.171 version 3.11.0 and 3GPP TS 23.271 version 6.10.0. However, these versions of the 3GPP standards do not allow the target UE to provide its location estimate in step 4.

Figure 4B:
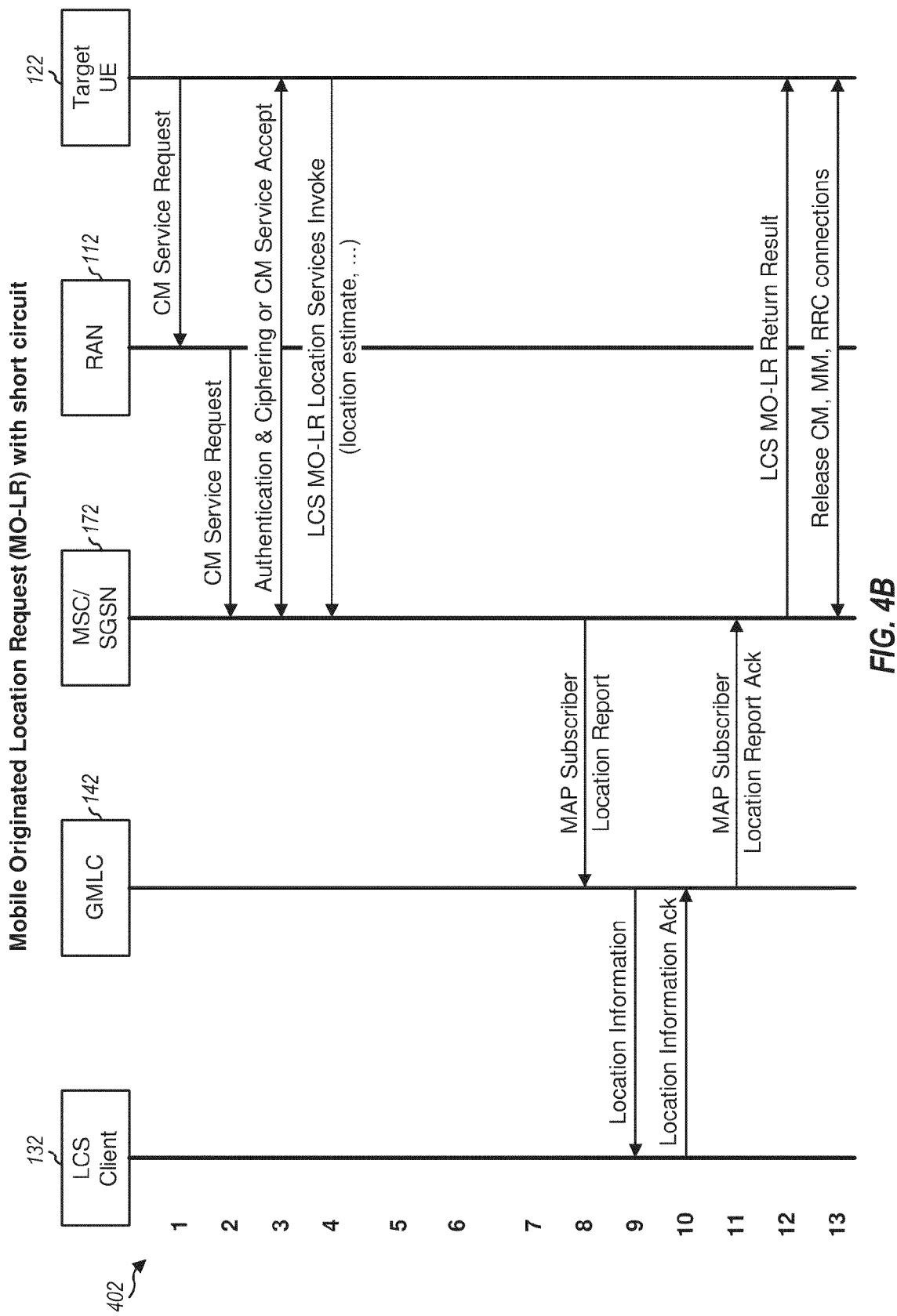
FIG. 4B shows the call flow in FIG. 4A with a short circuit for the location processing.

FIG. 4B shows a call flow 402 for mobile originated location request (MO-LR) with a short circuit for the location processing. Call flow 402 includes a subset of the steps in call flow 400 shown in FIG. 4A. Steps 1 through 4 in call flow 402 are the same as steps 1 through 4 in call flow 400. In step 4, UE 122 sends an LCS MO-LR Location Services Invoke message that contains a location estimate for the UE. MSC/SGSN 172 receives this message, decides to use the location estimate provided by UE 122, bypasses the location processing in steps 5 through 7 of call flow 400, and provides this location estimate to LCS client 132 via GMLC 142 in steps 8 through 11.

Figure 5:
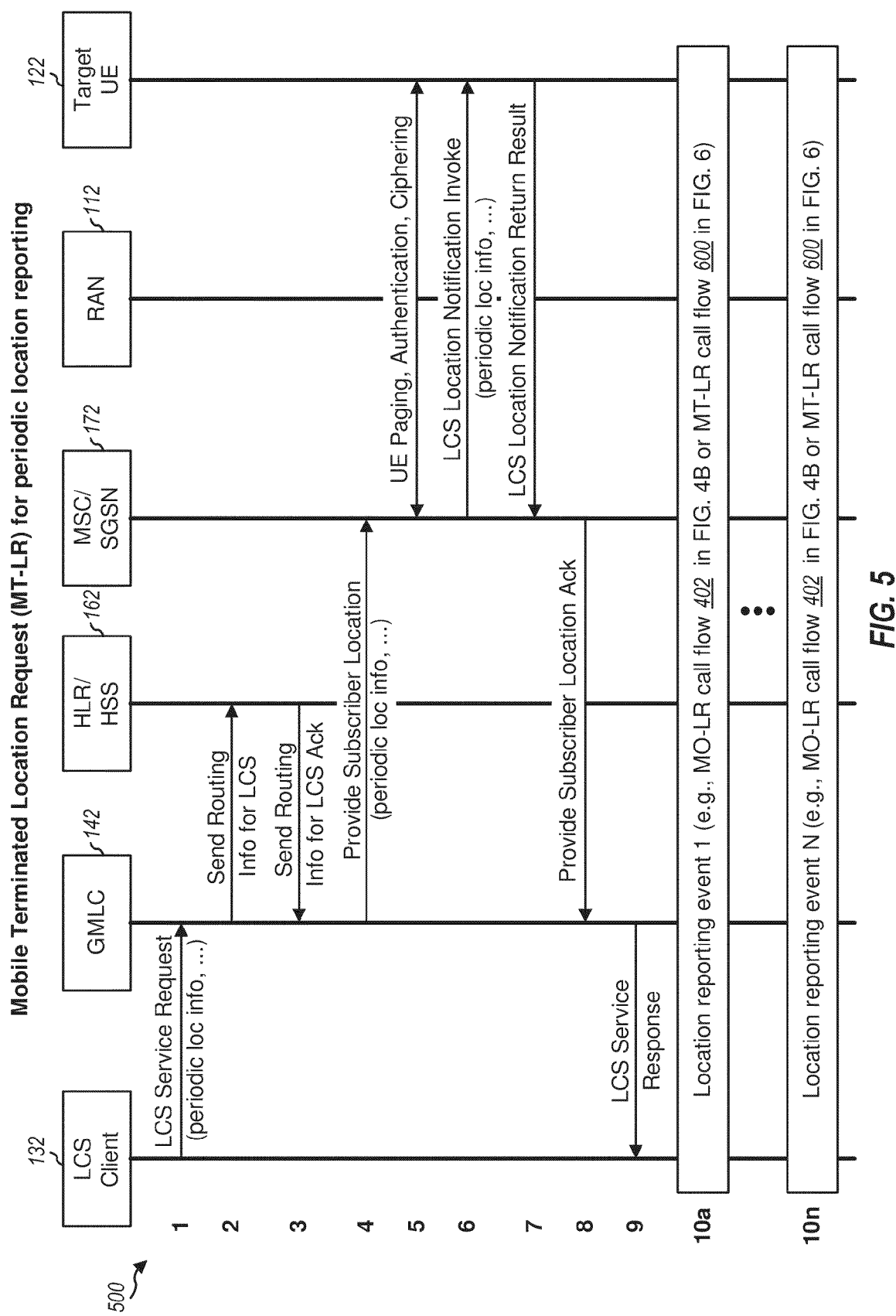
FIG. 5 shows a call flow for MT-LR periodic location reporting.

FIG. 5 shows an exemplary call flow 500 for mobile terminated location request (MT-LR) for periodic location reporting in network 102 shown in FIG. 1B. A periodic location request is a request for periodic location reporting or periodic location service, which provides location estimates for a target UE based on periodic location information that indicates when to report the UE location to an LCS client. The periodic location information conveys rules for determining location reporting and may be given by a schedule of reporting events, a set of triggering events, and so on, or a combination thereof. The schedule may be given in various formats such as, e.g., (1) a start time and a stop time for the location reporting and a time interval between reporting events, (2) a start time and a duration for the location reporting and a time interval between reporting events (3) a start time for the location reporting, a particular number of reporting events, and a time interval between reporting events, or (4) some other format. The start time for the first reporting event may be the present time (now) or a predetermined time in the future. The triggering events may correspond to, e.g., the UE becoming available, the UE entering or leaving predefined geographic areas, the UE being within the predefined geographic areas, the UE velocity or acceleration exceeding predefined thresholds, the UE location, velocity or acceleration changing by predefined threshholds, and so on.

For call flow 500, LCS client 132 sends to GMLC 142 an LCS Service Request message to request periodic location reporting for target UE 122 (step 1). The LCS Service Request message contains periodic location information ("periodic loc info"). GMLC 142 verifies, authenticates, and authorizes LCS client 132 for the requested LCS service (also step 1). If LCS client 132 is authorized, then GMLC 142 and HLR/HSS 162 exchanges signaling in steps 2 and 3, as described above for call flow 300 shown in FIG. 3A.

GMLC 142 then sends to MSC/SGSN 172 a Provide Subscriber Location message that contains pertinent information such as, e.g., the location information requested, the UE identifier, the LCS QoS, the start time, stop time, and interval for periodic location reporting, and so on (step 4). MSC/SGSN 172 may authenticate GMLC 142 and verify that the location request is allowed (also step 4). If the location request is allowed, then MSC/SGSN 172 may invoke the wireless network to perform paging, authentication and ciphering of UE 122 (step 5). In an embodiment, MSC/SGSN 172 sends to UE 122 an LCS Location Notification Invoke message that contains pertinent information such as, e.g., type of location request, the identity of LCS client 132, the periodic location information, a prioritized list of PLMNs in which periodic location reporting is allowed (e.g., MO-LR call flow 402 may be originated for steps 10a to 10n) (step 6). If this list of PLMNs is not provided, then subsequent location reporting may be restricted to only the current PLMN. For a single-shot location request, e.g., as shown in FIG. 3A, the LCS Location Notification Invoke message is sent to the UE to provide notification of the location request and to allow the wireless user at the UE to decide whether to allow or deny the location request. For periodic location reporting as shown in FIG. 5, the LCS Location Notification Invoke message serves one or two purposes—to convey the periodic location information and, if needed, to notify the UE of a request for periodic location reporting and to enable the UE user to accept or reject this request. In another embodiment, MSC/SGSN 172 sends to UE 122 an LCS Periodic Location Invoke message that serves to convey the periodic location information and, optionally, to notify the request. The LCS Location Notification Invoke message may or may not be sent. If the LCS Location Notification Invoke message is sent, then UE 122 performs notification and/or verification if required. UE 122 then sends to MSC/SGSN 172 an LCS Location Notification Return Result message that indicates whether permission is granted or denied (step 7).

MSC/SGSN 172 then sends to GMLC 142 a Provide Subscriber Location Acknowledgment message that acknowledges the request sent by the GMLC in step 4 (step 8). GMLC 142 then sends to LCS client 132 an LCS Service Response message that acknowledges the request sent by the LCS client in step 1 (step 9).

In an embodiment, based on the periodic location information, UE 122 periodically initiates MO-LR call flow 402 shown in FIG. 4B and provides its location estimate to the LCS client (steps 10a through 10n). Call flow 402 may be performed with much less signaling and in a shorter time than MT-LR call flow 300 in FIG. 3A or MO-LR call flow 400 in FIG. 4A. UE 122 may perform MO-LR call flow 400 whenever needed in order to obtain updated assistance data and/or a new location estimate for itself. In another embodiment, the network periodically initiates MT-LR call flow 300 shown in FIG. 3A. For this embodiment, UE 122 can provide its location estimate (if available) in step 7 of call flow 300, and the network can short circuit the location processing if a suitable location estimate is received from the UE.

In yet another embodiment, based on the periodic location information, GMLC 142 periodically initiates an MT-LR call flow to obtain a location estimate for UE 122 and to provide this location estimate to the LCS client (steps 10a through 10n). GMLC 142 becomes aware of the periodic location reporting for UE 122 based on the periodic location information in the LCS Service Request message received from LCS client 132 in step 1 of call flow 500 in FIG. 5. GMLC 142 may store (or cache) the periodic location information as well as other pertinent information for the periodic location service (e.g., information regarding the target UE), which may have been obtained from HLR/HSS 162 in step 3 of call flow 500 in FIG. 5. GMLC 142 may thereafter use the cached information for each subsequent MT-LR call flow to avoid subsequent query of HLR/HSS 162.

Figure 6:
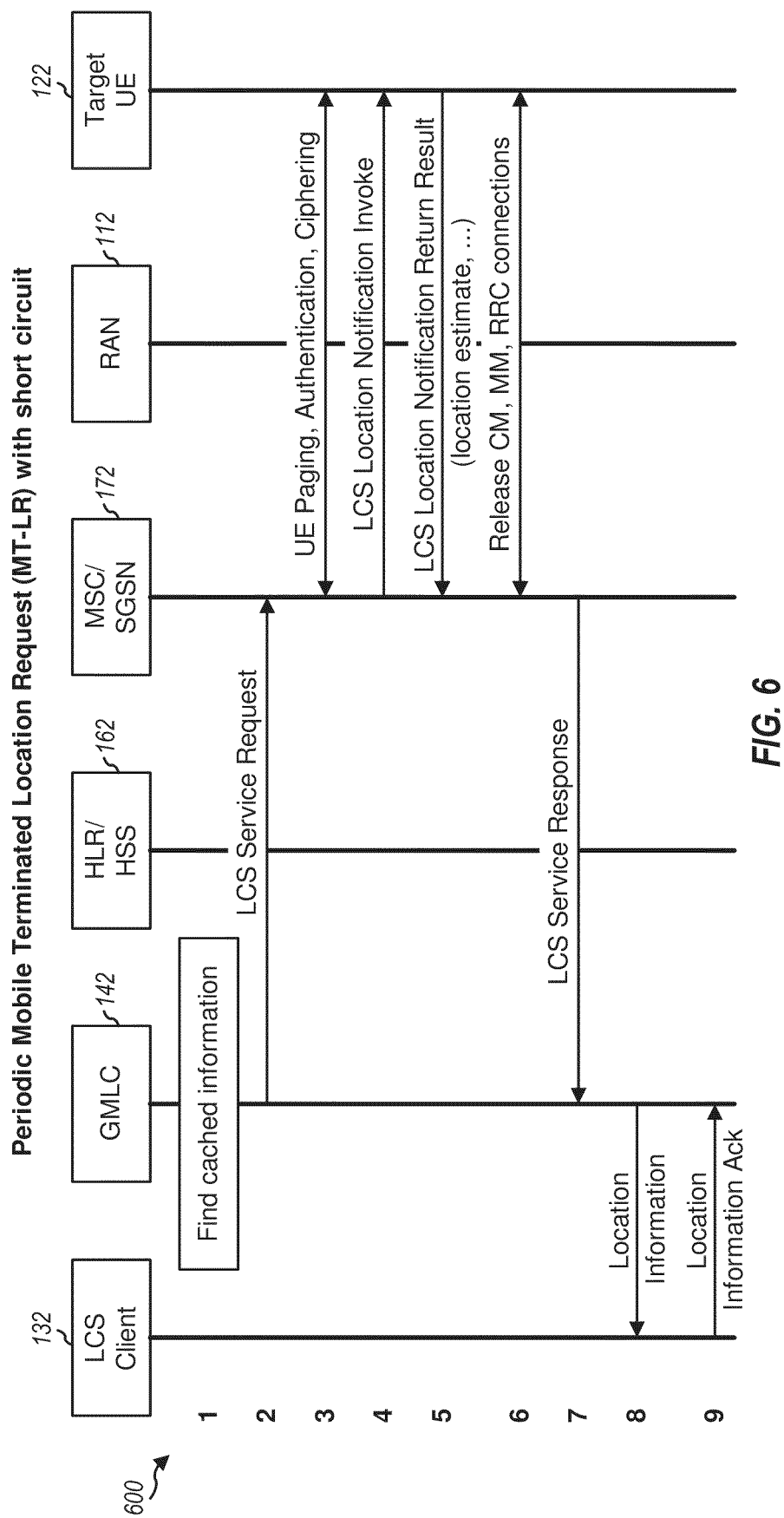
FIG. 6 shows a call flow for MT-LR with short circuit.

FIG. 6 shows a call flow 600 for MT-LR with short circuit, which may be used for each location reporting event for periodic location reporting (e.g., for each of step 10a through 10n in call flow 500 in FIG. 5). For call flow 600, GMLC 142 finds the cached information for the periodic location reporting that was previously initiated, e.g., by LCS client 132 with MT-LR call flow 500 in FIG. 5 (step 1). If multiple GMLCs are involved (e.g., if V-GMLC and H-GMLC are involved due to UE 122 roaming and/or LCS client 132 not being in the home network), then each GMLC may retrieve the cached information for the periodic location reporting for UE 122. GMLC 142 then sends to MSC/SGSN 172 an LCS Service Request message to request the current location of target UE 122 (step 2). The address of MSC/SGSN 172 and the identifier of UE 122 are part of the information cached by GMLC 142. MSC/SGSN 172 may authenticate GMLC 142 and verify that the location request is allowed (also step 2). Steps 3, 4 and 5 of call flow 600 are the same as steps 5, 6 and 7, respectively, of call flow 300 in FIG. 3A. In step 5, UE 122 sends an LCS Location Notification Return Result message that contains a location estimate for the UE.

After obtaining a suitable location estimate for UE 122 in step 5, MSC/SGSN 172 may release the CM, MM or GMM, and RR/RRC connections to UE 122 (step 6). MSC/SGSN 172 then sends to GMLC 142 an LCS Service Response message that contains the location estimate for UE 122 and possibly other pertinent information (step 7). GMLC 142 then sends to LCS client 132 an LCS Service Response message that contains the location estimate for UE 122 (step 7). GMLC 142 then sends to LCS client 132 the location information that contains the location estimate for UE 122 (step 8). LCS client 132 responds by sending a location information acknowledgment to GMLC 142 (step 9).

Figure 7:
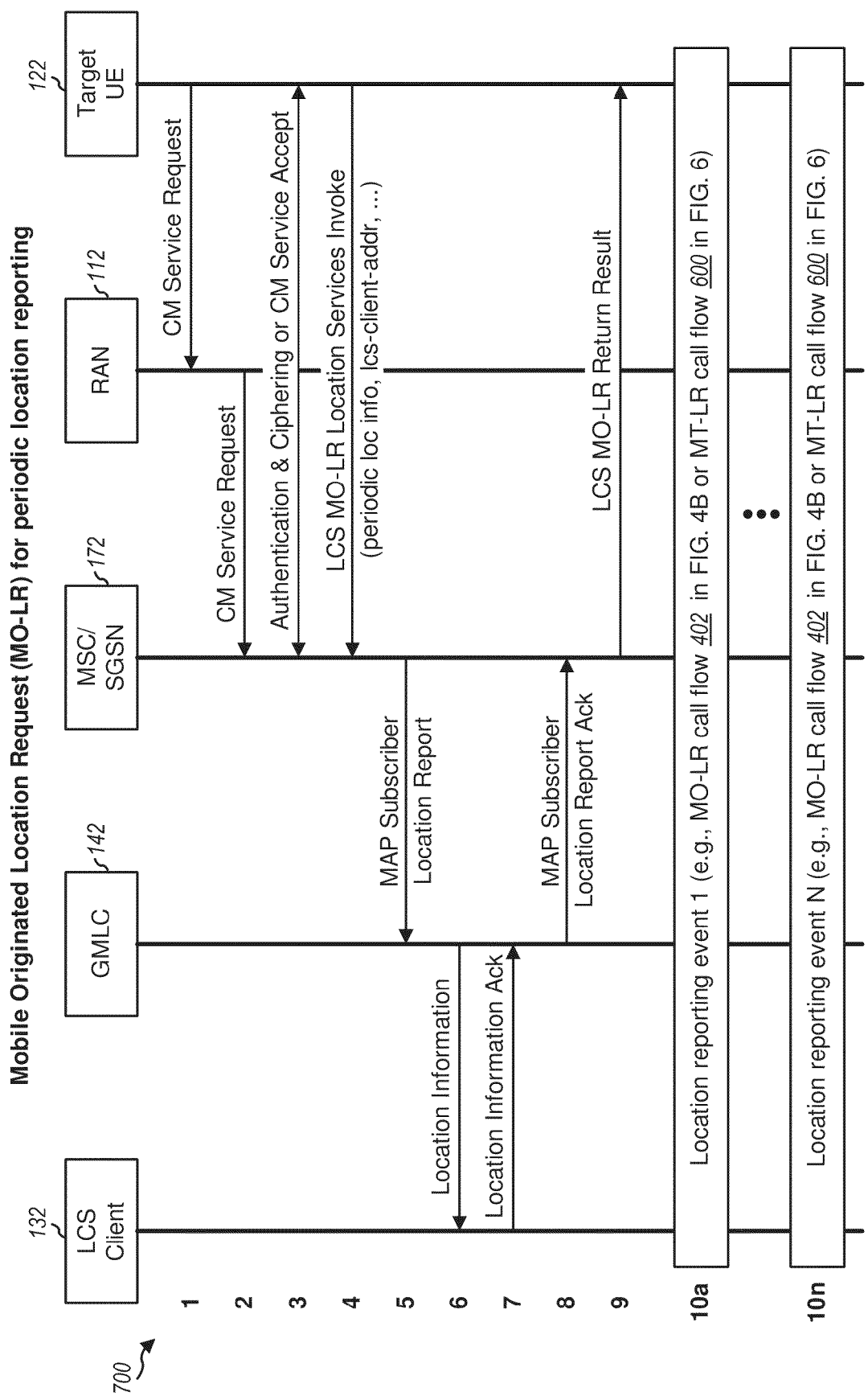
FIG. 7 shows a call flow for MO-LR periodic location reporting.

FIG. 7 shows an exemplary call flow 700 for mobile originated location request (MO-LR) for periodic location reporting in network 102 shown in FIG. 1B. For call flow 700, UE 122 sends to MSC/SGSN 172 via RAN 112 a CM Service Request message that indicates a request for a call independent supplementary service (steps 1 and 2). MSC/SGSN 172 instigates authentication and ciphering if UE 122 was in an idle mode or returns a Direct Transfer CM Service Accept message if UE 122 was in a dedicated mode (step 3). Steps 1 through 3 are for a CS domain connection setup and would be different for a PS domain connection setup.

UE 122 then sends to MSC/SGSN 172 an LCS MO-LR Location Services Invoke message to request periodic location reporting of target UE 122 to LCS client 132 (step 4). The LCS MO-LR Location Services Invoke message contains periodic location information ("periodic loc info"), which may be given using any of the formats described above for the LCS Service Request message sent in step 1 of call flow 500 in FIG. 5. For example, the periodic location information may include a schedule containing a start time, a reporting interval, and one of a stop time, a duration, or a particular number of reports. The periodic location information may in addition or instead indicate specific events that will be used to trigger location reporting to the LCS client. The LCS Service Request message may also include the identity of LCS client 132 ("lcs-client-addr") and the identity of GMLC 142 through which LCS client 132 can be accessed. The LCS Service Request message may also include the preferred method for periodic location reporting, e.g., whether by using a network instigated MT-LR or a UE instigated MO-LR.

In an embodiment, one or more network entities can decide whether to allow UE 122 to use a call flow with short circuit to provide a location estimate for the UE for periodic location reporting. For this embodiment, UE 122 may request for permission to use short circuit for subsequent location reporting events (e.g., if UE 122 supports UE-based positioning mode) and may include this request in the LCS MO-LR Location Services Invoke message sent to MSC/SGSN 172 in step 4 of call flow 700. In an embodiment, MSC/SGSN 172, GMLC 142, and LCS client 132 may accept or reject the UE request to use short circuit. The UE request may be accepted if UE 122 is allowed and trusted to provide location estimates directly to MSC/SGSN 172 (e.g., via an LCS MO-LR Location Service Invoke message) without verification by RAN 112. The use short circuit may be controlled for various purposes such as, e.g., to account for a lack of trust in either the UE accuracy and reliability or the UE integrity (e.g. spoofing), for billing and subscription issues, and so on. In another embodiment, UE 122 can autonomously decide whether to use a short circuit call flow to provide a location estimate for periodic location reporting.

MSC/SGSN 172 then sends to GMLC 142 a MAP Subscriber Location Report message that contains the request for periodic location reporting, the periodic location information (e.g., a schedule containing the start time, reporting interval, and one of stop time, duration, and number of reports), and the request to use MO-LR call flow 402 with short circuit (if any) (step 5). GMLC 142 sends the request for periodic location reporting and the associated information to LCS client 132 (step 6). In an embodiment, any entity (e.g., MSC/SGSN 172, GMLC 142, or LCS client 132) can refuse or accept the request for periodic location reporting. In an embodiment, if the periodic location request is accepted, then any entity can reject the use of MO-LR call flow 402 with short circuit and/or MT-LR call flow 600 with short circuit. If the periodic location request is accepted, then GMLC 142 assigns a reference ID that is used to associate all subsequent location reports with the original periodic location request.

LCS client 132 sends an acknowledgment for the periodic location request to GMLC 142 (step 7). GMLC 142 then sends to MSC/SGSN 172 a MAP Subscriber Location Report Acknowledgment message that indicates whether the periodic location request is accepted or rejected (step 8). If the periodic location request is accepted, then the MAP Subscriber Location Report Acknowledgment message further conveys whether a request to use short circuit is accepted, the reference ID assigned by GMLC 142, and the address of GMLC 142. MSC/SGSN 172 then sends to UE 122 an LCS MO-LR Return Result message that contains all of the pertinent information received from GMLC 142 (step 9). The LCS MO-LR Return Result message may further include a prioritized list of PLMNs in which periodic location reporting is allowed (e.g., MO-LR call flow 402 may be originated for steps 10*a* to 10*n*). If this list of PLMNs is not provided, then subsequent location reporting may be restricted to only the current PLMN.

UE 122 may instigate release of the CM, MM or GMM, and RR/RRC connections, e.g., if the periodic location request is rejected or if the list of PLMNs does not include the serving PLMN (not shown in FIG. 7). Alternatively, if the periodic location request is accepted and the serving PLMN can be used for subsequent location reporting events, then UE 122 may initiate reporting of the first location estimate by sending an LCS MO-LR Location Services Invoke message to request transfer of the UE location to LCS client 132 (also not shown in FIG. 7).

In one embodiment, based on the periodic location information, UE 122 periodically initiates MO-LR call flow 402 shown in FIG. 4B and provides its location estimate to the LCS client (steps 10*a* through 10*n*). UE 122 may perform MO-LR call flow 400 shown in FIG. 4A whenever needed in order to obtain updated assistance data and/or a new location estimate for itself In another embodiment, the network periodically initiates MT-LR call flow 300 shown in FIG. 3A. For this embodiment, UE 122 can provide its location estimate (if available) in step 7 of call flow 300, and the network can short circuit the location processing if a suitable location estimate is received from the UE. In yet another embodiment, GMLC 142 periodically initiates MT-LR call flow 600 in FIG. 6 to obtain a location estimate for UE 122. For this embodiment, UE 122 can provide its location estimate (if available) in step 5 of call flow 600, and the location processing can be short circuited (as shown in FIG. 6) if a suitable location estimate is received from the UE.

Network-initiated position determination may be initiated by MSC/SGSN 172 (e.g. for billing or for an E911 call). For network-initiated position determination, steps 1 through 4 and steps 11 and 12 in FIGS. 3A and 3B would be omitted. Network-initiated periodic location service may also be initiated by MSC/SGSN 172. For network-initiated periodic location service, steps 1 through 4 and steps 8 and 9 in FIG. 5 would be omitted, steps 8 through 11 in FIG. 4B would be omitted, and steps 1 and 2 and steps 7 through 9 in FIG. 6 would be omitted.

For clarity, specific call flows with specific steps and messages have been described above in FIGS. 2A through 7. In general, call flows for network-initiated and UE-initiated position determination may include any number of steps, which may be different from the steps shown in FIGS. 2A through 7. Furthermore, a call flow may include any number of steps, and each step may include any number of message exchanges, any type of processing at any entity, and so on. A call flow may also use messages that may be different from the messages shown in FIGS. 2A through 7. In general, the target UE may provide its location estimate in any message and at any time in the call flow, even though this location estimate may not be requested by the network. The network may elect to use the location estimate provided by the UE and bypass the location processing with the UE.

The short circuit techniques described herein may be used for various networks and architectures such as the pre-SUPL architecture shown in FIG. 1A, the SUPL architecture promulgated by OMA, the 3GPP control plane architecture shown in FIG. 1B, a 3GPP2 control plane architecture described in IS-881 and 3GPP2 X.50002, and so on. The short circuit techniques may also be used for circuit-switched (CS) calls and packet-switched (PS) calls, albeit the messages for the call flows may be different.

The location estimate for the target UE (e.g., sent in the SLREQ message, the LCS Location Notification Return Result message, and the LCS MO-LR Location Services Invoke message) may be given in various formats. In an embodiment, a 2-dimensional (2D) location estimate includes a latitude and a longitude for the estimated location of the target UE. The latitude may be expressed with (1) a sign bit that indicates whether the estimated location is in the northern or southern hemisphere and (2) an encoded value $N_{lat}$ for the latitude $X_{lat}$ of the target UE, where $X_{lat}$ ranges from 0° to 90°. If 24 bits are available to represent latitude, then one bit may be used for the sign bit and 23 bits may be used for $N_{lat}$, which may be expressed as: $N_{lat} \leq (2^{23} \cdot X_{lat}/90) < (N_{lat}+1)$. The longitude may be expressed with an encoded value $M_{long}$ for the longitude $X_{long}$ of the target UE, where $X_{long}$ ranges from −180° to +180°. If 24 bits are available to represent longitude, then $M_{long}$ may be expressed as: $N_{long} \leq (2^{24} \cdot X_{long}/360) < (N_{long}+1)$. A 3-D location estimate includes a latitude, a longitude, and an altitude for the estimated location of the target UE. The altitude may be expressed with (1) a sign bit that indicates whether the estimated altitude is above or below a WGS84 (World Geodetic System 1984) ellipsoid and (2) the actual altitude (in meters) relative to the WGS84 ellipsoid.

A 2-D or 3-D location estimate also typically includes an uncertainty area or volume, e.g. an ellipse or ellipsoid, and a confidence. The uncertainty area indicates the uncertainty in the estimated 2-D location of the target UE. An uncertainty ellipse may be given by a latitude/longitude uncertainty code associated with the major axis of the ellipse, a latitude/longitude uncertainty code associated with the minor axis of the ellipse, and the orientation in degree of the major axis with respect to North. The uncertainty code may be given by a formula that maps each uncertainty code value to a corresponding uncertainty in meters. The uncertainty volume (e.g., ellipsoid) indicates the uncertainty in the estimated 3-D location of the target UE. The confidence indicates the likelihood of the estimated location being within the uncertainty area (for the 2-D estimated location) or the uncertainty volume (for the 3-D estimated location). The confidence may be expressed in percentage from 0 to 100. The various fields of the location estimate are described in further detail in a document 3GPP TS 23.032, which is publicly available. In addition to providing a location estimate, the location information transferred periodically to the LCS client may include other geographic information such as the velocity and acceleration of the UE.

Figure 8:
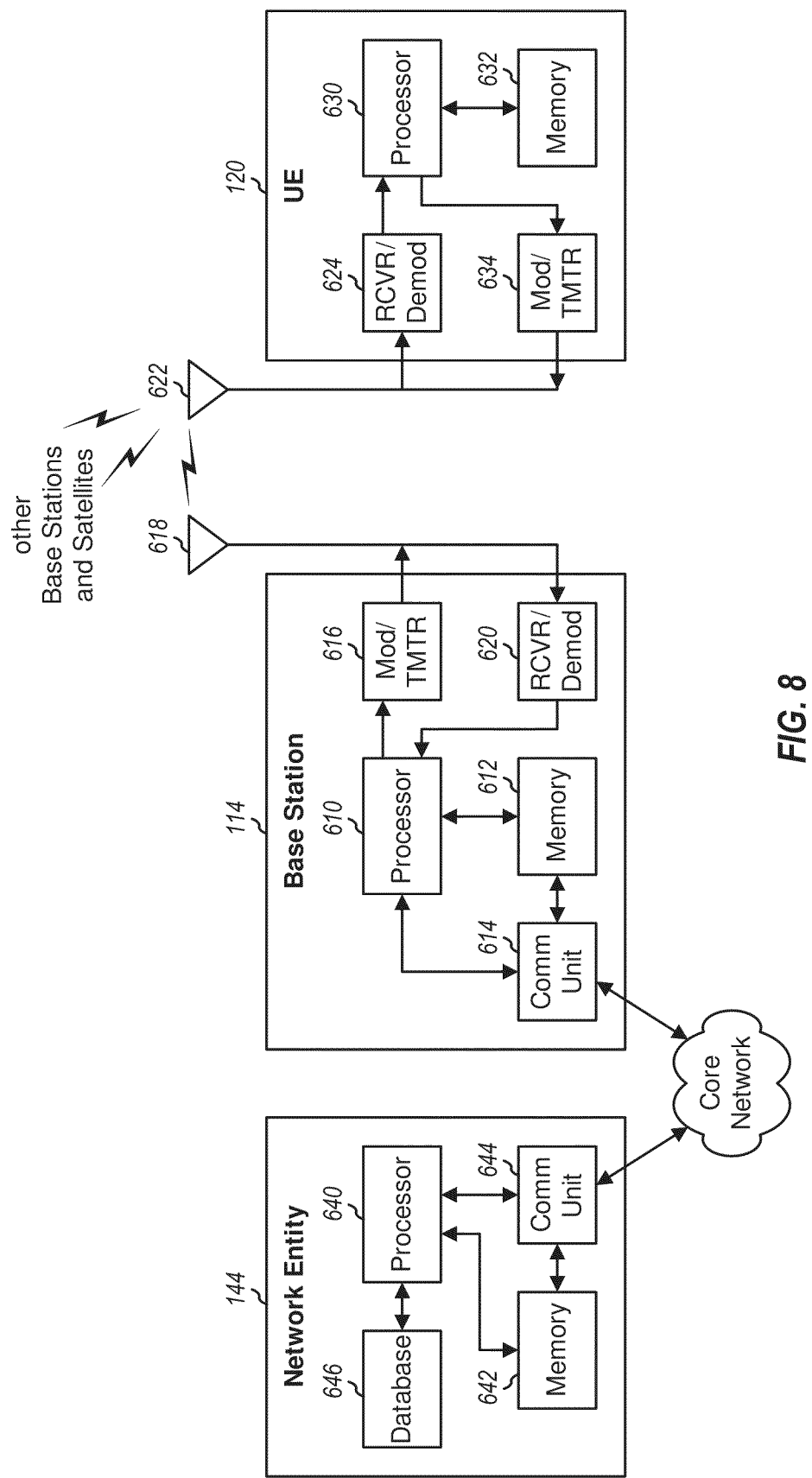
FIG. 8 shows a block diagram of various entities in the network in FIG. 1A or 1B.

FIG. 8 shows a block diagram of various entities in network 100 in FIG. 1A or network 102 in FIG. 1B. UE 120 may be a cellular telephone, a user terminal, a computer with a wireless modem, a stand-alone position determination unit, or some other device. A base station 114 provides wireless communication for wireless network 110. For simplicity, only one network entity 144 is shown in FIG. 8. Network entity 144 may be any of the network entities shown in FIG. 1A or 1B (e.g., LCS client 130, LCS manager 140, or positioning server 150 in FIG. 1A).

On the forward link, base station 114 transmits data, signaling, and pilot to the UEs within its coverage area. These various types of data are processed (e.g., encoded, modulated, filtered, amplified, quadrature modulated, and upconverted) by a modulator/transmitter (Mod/TMTR) 616 to generate a forward link modulated signal, which is transmitted via an antenna 618. At UE 120, an antenna 622 receives the forward link modulated signals from base station 114 and possibly other base stations and provides a receiver input signal to a receiver/demodulator (RCVR/Demod) 624. The receiver input signal may include received signals for base stations and possibly satellites. RCVR/Demod 624 processes the receiver input signal in a manner complementary to the processing performed by the transmitter(s) and provides various types of information that may be used for position determination. For example, RCVR/Demod 624 may provide the time of arrival of received signals (which may be used for position determination), decoded messages used for the call flows described above, and so on. A processor 630 performs processing for UE 120. A memory unit 632 stores program codes and data for processor 630.

On the reverse link, UE 120 may transmit data, signaling, and pilot to base station 114. These various types of data are processed by a modulator/transmitter (Mod/TMTR) 634 to generate a reverse link modulated signal, which is transmitted via antenna 622. At base station 114, antenna 618 receives the reverse link modulated signal from UE 120 and provides a receiver input signal to a receiver/demodulator (RCVR/Demod) 620. RCVR/Demod 620 processes the receiver input signal in a manner complementary to the processing performed by the UEs and provides various types of information to a processor 610. Processor 610 performs processing for base station 114. A memory unit 612 stores program codes and data for processor 610. A communication (Comm) unit 614 allows base station 114 to exchange data with other network entities.

Within network entity 144, a communication unit 644 allows network entity 144 to communicate with other network entities. A processor 640 performs processing for network entity 144. A memory unit 642 stores program codes and data for processor 640. A database 646 stores information pertinent for network entity 144 (e.g., subscriber information, location information, GPS assistance data, and so on).

The method and apparatus described herein may be implemented by various means. For example, the method and apparatus may be implemented in hardware, software, or a combination thereof. For a hardware implementation, the units used to perform the processing described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof For a software implementation, the method may be implemented with modules (e.g., procedures, functions, and so on) that perform the functions described herein. The software codes may be stored in a memory unit (e.g., memory unit 632 or 642 in FIG. 8) and executed by a processor (e.g., processor 630 or 640). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing position determination in a network, comprising:
   receiving from a user equipment (UE) a request for a position estimate;
   receiving cached position information for the UE if sent by the UE;
   performing location processing to obtain a position fix for the UE if the cached position information for the UE is not received; and
   using the cached position information for the UE and bypassing the location processing if the cached position information for the UE is received.

2. The method of claim 1, further comprising providing the cached position information for the UE to a client entity.

3. The method of claim 1, wherein the performing location processing comprises initiating a location session between the UE and a network entity designated to support position determination for the UE, wherein the network entity and the UE perform the position fix for the UE, and receiving from the network entity the position fix for the UE.

4. The method of claim 1, wherein the using the cached position information for the UE comprises determining whether the cached position information received from the UE meets at least one criterion, and using the cached position information if the at least one criterion is met.

5. The method of claim 1, wherein the using the cached position information for the UE comprises determining whether the cached position information received from the UE meets quality of service requirements, and using the cached position information if the quality of service requirements are met.

6. The method of claim 1, further comprising receiving from the UE a request to use short circuit to bypass the location processing and sending to the UE an indication of allowance to use the short circuit for the location processing.

7. An apparatus comprising:
   a communication unit operative to receive from a user equipment (UE) a request for a position estimate, and to receive cached position information for the UE if sent by the UE; and
   a processor operative to perform location processing to obtain a position fix for the UE if the cached position information for the UE is not received and to use the cached position information for the UE and bypass the location processing if the cached position information for the UE is received.

8. The apparatus of claim 7, wherein the communication unit is further operative to provide the cached position information for the UE to a client entity.

9. The apparatus of claim 7, wherein the processor is operative to initiate a location session between the UE and a network entity designated to support position determination for the UE in order to perform the position fix for the UE, and wherein the communication unit is operative to receive from the network entity the position fix for the UE.

10. The apparatus of claim 7, wherein the processor is operative to determine whether the cached position information received from the UE meets at least one criterion and to use the cached position information if the at least one criterion is met.

11. An apparatus comprising:
    means for receiving from a user equipment (UE) a request for a position estimate;
    means for receiving cached position information for the UE if sent by the UE;
    means for performing location processing to obtain a position fix for the UE if the cached position information for the UE is not received; and
    means for using the cached position information for the UE and bypassing the location processing if the cached position information for the UE is received.

12. The apparatus of claim 11, further comprising means for providing the cached position information for the UE to a client entity.

13. The apparatus of claim 11, wherein the means for performing location processing comprises means for initiating a location session between the UE and a network entity designated to support position determination for the UE, wherein the network entity and the UE perform the position fix for the UE, and means for receiving from the network entity the position fix for the UE.

14. The apparatus of claim 11, wherein the means for using the cached position information for the UE comprises means for determining whether the cached position information received from the UE meets at least one criterion, and using the cached position information if the at least one criterion is met.

15. A non-transitory computer-readable medium including program code stored thereon, comprising:
    program code to process a request received from a user equipment (UE) for a position estimate;
    program code to process received cached position information for the UE if sent by the UE;
    program code to perform location processing to obtain a position fix for the UE if the cached position information for the UE is not received; and
    program code to use the cached position information for the UE and bypassing the location processing if the cached position information for the UE is received.

16. The non-tangible computer-readable medium of claim 15, further comprising program code to initiate a location session between the UE and a network entity designated to support position determination for the UE in order to perform the position fix for the UE.

17. The non-tangible computer-readable medium of claim 15, further comprising program code to determine whether the cached position information received from the UE meets at least one criterion and to use the cached position information if the at least one criterion is met.

18. A method of performing position determination in a network, comprising:
    receiving from a user equipment (UE) signaling to request periodic location reporting for the UE, the signaling including periodic location information indicative of when to report location of the UE; and
    for each location reporting indicated by the periodic location information,
    receiving cached position information for the UE if sent by the UE;
    performing location processing to obtain a position fix for the UE if the cached position information for the UE is not received; and
    using the cached position information for the UE and bypassing the location processing if the cached position information for the UE is received.

19. The method of claim 18, further comprising providing the cached position information for the UE to a client entity.

20. The method of claim 18, wherein the performing location processing comprises initiating a location session between the UE and a network entity designated to support position determination for the UE, wherein the network entity and the UE perform the position fix for the UE, and receiving from the network entity the position fix for the UE.

21. The method of claim 18, wherein the using the cached position information for the UE comprises determining whether the cached position information received from the UE meets at least one criterion, and using the cached position information if the at least one criterion is met.

22. The method of claim 18, wherein the using the cached position information for the UE comprises determining whether the cached position information received from the UE meets quality of service requirements, and using the cached position information if the quality of service requirements are met.

23. The method of claim 18, further comprising receiving from the UE signaling that includes a request for use of short circuit to bypass the location processing, and sending to the UE an indication of allowance to use the short circuit for the location processing.

24. An apparatus comprising:
    a communication unit operative to receive from a user equipment (UE) signaling to request periodic location reporting for the UE, the signaling including periodic location information indicative of when to report location of the UE, and to receive cached position information for the UE if sent by the UE; and
    a processor operative, for each location reporting indicated by the periodic location information, to perform location processing to obtain a position fix for the UE if the cached position information for the UE is not received and to use the cached position information for the UE and bypass the location processing if the cached position information for the UE is received.

25. The apparatus of claim 24, wherein the communication unit is further operative to provide the cached position information for the UE to a client entity.

26. The apparatus of claim 24, wherein the processor is operative to initiate a location session between the UE and a network entity designated to support position determination for the UE in order to perform the position fix for the UE, and wherein the communication unit is operative to receive from the network entity the position fix for the UE.

27. The apparatus of claim 24, wherein the processor is operative to determine whether the cached position information received from the UE meets at least one criterion and to use the cached position information if the at least one criterion is met.

28. An apparatus comprising:
   means for receiving from a user equipment (UE) signaling to request periodic location reporting for the UE, the signaling including periodic location information indicative of when to report location of the UE; and
   means for processing each location reporting indicated by the periodic location information, comprising:
   means for receiving cached position information for the UE if sent by the UE;
   means for performing location processing to obtain a position fix for the UE if the cached position information for the UE is not received; and
   means for using the cached position information for the UE and bypassing the location processing if the cached position information for the UE is received.

29. The apparatus of claim 28, further comprising means for providing the cached position information for the UE to a client entity.

30. The apparatus of claim 28, wherein the means for performing location processing comprises means for initiating a location session between the UE and a network entity designated to support position determination for the UE, wherein the network entity and the UE perform the position fix for the UE, and means for receiving from the network entity the position fix for the UE.

31. The apparatus of claim 28, wherein the means for using the cached position information for the UE comprises means for determining whether the cached position information received from the UE meets at least one criterion, and using the cached position information if the at least one criterion is met.

32. A non-transitory computer-readable medium including program code stored thereon, comprising:
   program code to process signaling received from a user equipment (UE) to request periodic location reporting for the UE, the signaling including periodic location information indicative of when to report location of the UE; and
   program code to receive cached position information for the UE if sent by the UE for each location reporting indicated by the periodic location information;
   program code to perform location processing to obtain a position fix for the UE if the cached position information for the UE is not received for each location reporting indicated by the periodic location information; and
   program code to use the cached position information for the UE and bypassing the location processing if the cached position information for the UE is received for each location reporting indicated by the periodic location information.

33. The non-tangible computer-readable medium of claim 32, further comprising program code to initiate a location session between the UE and a network entity designated to support position determination for the UE in order to perform the position fix for the UE.

34. The non-tangible computer-readable medium of claim 32, further comprising program code to determine whether the cached position information received from the UE meets at least one criterion and to use the cached position information if the at least one criterion is met.

35. A method of performing position determination, comprising:
   sending signaling to a user equipment (UE) to initiate periodic location reporting for the UE, the signaling including periodic location information indicative of when to report location of the UE; and
   for each location reporting indicated by the periodic location information,
   receiving cached position information for the UE if sent by the UE;
   performing location processing to obtain a position fix for the UE if the cached position information for the UE is not received; and
   using the cached position information for the UE and bypassing the location processing if the cached position information for the UE is received.

36. The method of claim 35, further comprising providing the cached position information for the UE to a client entity.

37. The method of claim 35, wherein the performing location processing comprises initiating a location session between the UE and a network entity designated to support position determination for the UE, wherein the network entity and the UE perform the position fix for the UE, and receiving from the network entity the position fix for the UE.

38. The method of claim 35, wherein the using the cached position information for the UE comprises determining whether the cached position information received from the UE meets at least one criterion, and using the cached position information if the at least one criterion is met.

39. The method of claim 35, wherein the using the cached position information for the UE comprises determining whether the cached position information received from the UE meets quality of service requirements, and using the cached position information if the quality of service requirements are met.

40. An apparatus comprising:
   a communication unit operative to send to a user equipment (UE) signaling to request periodic location reporting for the UE, the signaling including periodic location information indicative of when to report location of the UE, and to receive cached position information for the UE if sent by the UE; and
   a processor operative, for each location reporting indicated by the periodic location information, to perform location processing to obtain a position fix for the UE if the cached position information for the UE is not received and to use the cached position information for the UE and bypass the location processing if the cached position information for the UE is received.

41. The apparatus of claim 40, wherein the communication unit is further operative to provide the cached position information for the UE to a client entity.

42. The apparatus of claim 40, wherein the processor is operative to initiate a location session between the UE and a network entity designated to support position determination for the UE in order to perform the position fix for the UE, and wherein the communication unit is operative to receive from the network entity the position fix for the UE.

43. The apparatus of claim 40, wherein the processor is operative to determine whether the cached position information received from the UE meets at least one criterion and to use the cached position information if the at least one criterion is met.

44. An apparatus comprising:
   means for sending to a user equipment (UE) signaling to request periodic location reporting for the UE, the signaling including periodic location information indicative of when to report location of the UE; and
   means for processing each location reporting indicated by the periodic location information, comprising:

means for receiving cached position information for the UE if sent by the UE;

means for performing location processing to obtain a position fix for the UE if the cached position information for the UE is not received; and means for using the cached position information for the UE and bypassing the location processing if the cached position information for the UE is received.

45. The apparatus of claim 44, further comprising means for providing the cached position information for the UE to a client entity.

46. The apparatus of claim 44, wherein the means for performing location processing comprises means for initiating a location session between the UE and a network entity designated to support position determination for the UE, wherein the network entity and the UE perform the position fix for the UE, and means for receiving from the network entity the position fix for the UE.

47. The apparatus of claim 44, wherein the means for using the cached position information for the UE comprises means for determining whether the cached position information received from the UE meets at least one criterion, and using the cached position information if the at least one criterion is met.

48. A non-transitory computer-readable medium including program code stored thereon, comprising:

program code to send signaling to a user equipment (UE) to initiate periodic location reporting for the UE, the signaling including periodic location information indicative of when to report location of the UE;

program code to receive cached position information for the UE if sent by the UE for each location reporting indicated by the periodic location information;

program code to perform location processing to obtain a position fix for the UE if the cached position information for the UE is not received for each location reporting indicated by the periodic location information; and program code to use the cached position information for the UE and bypassing the location processing if the cached position information for the UE is received for each location reporting indicated by the periodic location information.

49. The non-tangible computer-readable medium of claim 48, further comprising program code to initiate a location session between the UE and a network entity designated to support position determination for the UE in order to perform the position fix for the UE.

50. The non-tangible computer-readable medium of claim 48, further comprising program code to determine whether the cached position information received from the UE meets at least one criterion and to use the cached position information if the at least one criterion is met.

51. A method of performing position determination, comprising:

receiving from a network signaling to initiate periodic location reporting for a user equipment (UE), the signaling including periodic location information indicative of when to report location of the UE; and for each location reporting indicated by the periodic location information, selectively sending cached position information for the UE to the network;

performing location processing to obtain a position fix for the UE if the location processing is initiated by the network; and bypassing the location processing if the cached position information is sent to the network and the location processing is not initiated by the network.

52. The method of claim 51, wherein the selectively sending to the network the cached position information for the UE comprises sending the cached position information for the UE to the network without the cached position information being requested by the network.

53. The method of claim 51, wherein the selectively sending to the network the cached position information for the UE comprises sending the cached position information for the UE to the network if the cached position information is available at the UE, a UE-based positioning mode is allowed, the cached position information is derived without interaction with the network, or if an indication to perform an immediate position fix for the UE is received from the network.

54. The method of claim 51, wherein the performing location processing comprises performing the location processing in accordance with a UE-based positioning mode or in accordance with a UE-assisted positioning mode.

55. The method of claim 51, wherein the cached position information for the UE comprises latitude and longitude information for the UE.

56. An apparatus comprising:

a communication unit operative to receive from a network signaling to initiate periodic location reporting for a user equipment (UE), the signaling including periodic location information indicative of when to report location of the UE, and to selectively send cached position information for the UE to the network; and a processor operative, for each location reporting indicated by the periodic location information, to perform location processing to obtain a position fix for the UE if the location processing is initiated by the network and to bypass the location processing if the cached position information is sent to the network and the location processing is not initiated by the network.

57. The apparatus of claim 56, wherein the communication unit is operative to selectively send to the network the cached position information for the UE if the cached position information is available at the UE, a UE-based positioning mode is allowed, the cached position information is derived without interaction with the network, or if an indication to perform an immediate position fix for the UE is received from the network.

58. The apparatus of claim 56, wherein the processor is operative to perform location processing in accordance with a UE-based positioning mode or in accordance with a UE-assisted positioning mode.

59. An apparatus comprising:

means for receiving from a network signaling to initiate periodic location reporting for a user equipment (UE), the signaling including periodic location information indicative of when to report location of the UE; and means for processing each location reporting indicated by the periodic location information, comprising:

means for selectively sending cached position information for the UE to the network;

means for performing location processing to obtain a position fix for the UE if the location processing is initiated by the network; and means for bypassing the location processing if the cached position information is sent to the network and the location processing is not initiated by the network.

60. The apparatus of claim 59, wherein the means for selectively sending cached position information for the UE to the network comprises means for selectively sending the cached position information for the UE to the network if the cached position information is available at the UE, a UE-based positioning mode is allowed, the cached position information is derived without interaction with the network, or if an indication to perform an immediate position fix for the UE is received from the network.

61. The apparatus of claim 59, wherein the means for performing location processing comprises means for performing the location processing in accordance with a UE-based positioning mode or in accordance with a UE-assisted positioning mode.

62. A non-transitory computer-readable medium including program code stored thereon, comprising:

program code to process signaling received from a network to initiate periodic location reporting for a user equipment (UE), the signaling including periodic location information indicative of when to report location of the UE;

program code to selectively send cached position information for the UE to the network for each location reporting indicated by the periodic location information;

program code to perform location processing to obtain a position fix for the UE if the location processing is initiated by the network for each location reporting indicated by the periodic location information; and program code to bypass the location processing if the cached position information is sent to the network and the location processing is not initiated by the network for each location reporting indicated by the periodic location information.

63. The non-transitory computer-readable medium of claim 62, wherein the program code to selectively send to the network the cached position information for the UE comprises program code to selectively send to the network the cached position information for the UE if the cached position information is available at the UE, a UE-based positioning mode is allowed, the cached position information is derived without interaction with the network, or if an indication to perform an immediate position fix for the UE is received from the network.

64. The non-transitory computer-readable medium of claim 62, wherein the program code to perform location processing comprises program code to perform location processing with the network in accordance with a UE-based positioning mode or in accordance with a UE-assisted positioning mode.

* * * * *